US011050059B2

(12) United States Patent
Charest et al.

(10) Patent No.: US 11,050,059 B2
(45) Date of Patent: Jun. 29, 2021

(54) COATED METAL OXIDE PARTICLES WITH LOW DISSOLUTION RATE, METHODS FOR PREPARING SAME AND USE THEREOF IN ELECTROCHEMICAL SYSTEMS

(71) Applicant: HYDRO-QUEBEC, Montréal (CA)

(72) Inventors: Patrick Charest, Sainte-Julie (CA);
Michel Perrier, Montréal (CA);
Martin Dontigny, Varennes (CA);
Michel Petitclerc, Saint-Julie (CA);
Abdelbast Guerfi, Brossard (CA);
Karim Zaghib, Longueuil (CA)

(73) Assignee: HYDRO-QUÉBEC, Montreal (CA)

( * ) Notice: Subject to any disclaimer, the term of this patent is extended or adjusted under 35 U.S.C. 154(b) by 271 days.

(21) Appl. No.: 15/675,184

(22) Filed: Aug. 11, 2017

(65) Prior Publication Data

US 2017/0346096 A1 Nov. 30, 2017

Related U.S. Application Data

(63) Continuation of application No. 12/162,095, filed as application No. PCT/CA2007/000091 on Jan. 24, 2017, now abandoned.

(30) Foreign Application Priority Data

Jan. 25, 2006 (CA) ................................ CA 2534243

(51) Int. Cl.
*H01M 4/62* (2006.01)
*H01M 4/139* (2010.01)
(Continued)

(52) U.S. Cl.
CPC .......... *H01M 4/621* (2013.01); *H01M 4/131* (2013.01); *H01M 4/136* (2013.01); *H01M 4/139* (2013.01);
(Continued)

(58) Field of Classification Search
CPC ...................................................... H01M 4/366
See application file for complete search history.

(56) References Cited

U.S. PATENT DOCUMENTS 4,808,496 A 2/1989 Hope et al.
5,366,829 A 11/1994 Saidi
(Continued)

FOREIGN PATENT DOCUMENTS

CN 1617371 A 5/2005
CN 1652776 A 8/2005
(Continued)

OTHER PUBLICATIONS

International Search Report.
(Continued)

*Primary Examiner* — Robert S Carrico
(74) *Attorney, Agent, or Firm* — Buchanan Ingersoll & Rooney P.C.

(57) ABSTRACT

Particles including a core and a coat covering at least part of the core surface. The core has more than 50% of an acidic metal oxide and the core coating is based on a polymer, preferably based on a solid polymer with high electrochemical stability. The particle has a solubility rate (ds), in fixed time, of the metal oxide migrating towards the electrolyte, per cycle, which is less than 5 per 10000. The particles are obtained by mixing the polymer and a metal oxide, via dry process with addition of solvent. The electrodes constituting an electrode substrate at least partly coated with a mixture consisting of at least 40 of those particles have remarkable electrochemical properties, in particular regarding the lifetime of batteries in which they are incorporated.

15 Claims, 9 Drawing Sheets

(51) Int. Cl.
| | |
|---|---|
| *H01M 4/36* | (2006.01) |
| *H01M 4/131* | (2010.01) |
| *H01M 4/136* | (2010.01) |
| *H01M 4/485* | (2010.01) |
| *H01M 4/58* | (2010.01) |
| *H01M 10/052* | (2010.01) |
| *H01M 10/0565* | (2010.01) |

(52) U.S. Cl.
CPC ........... *H01M 4/366* (2013.01); *H01M 4/625* (2013.01); *H01M 4/485* (2013.01); *H01M 4/5825* (2013.01); *H01M 10/052* (2013.01); *H01M 10/0565* (2013.01); *Y10T 29/49108* (2015.01)

(56) References Cited

U.S. PATENT DOCUMENTS

| | | | |
|---|---|---|---|
| 5,565,284 | A | 10/1996 | Koga et al. |
| 5,635,312 | A | 6/1997 | Yanagisawa et al. |
| 5,656,393 | A | 8/1997 | Boer et al. |
| 5,744,936 | A | 4/1998 | Kawakami |
| 5,888,672 | A | 3/1999 | Gustafson et al. |
| 6,174,623 | B1 | 1/2001 | Shackle |
| 6,190,804 | B1 | 2/2001 | Ishiko et al. |
| 6,280,882 | B1 | 8/2001 | Vallee et al. |
| 2002/0028380 | A1 | 3/2002 | Tanjo et al. |
| 2003/0082448 | A1 | 5/2003 | Cho et al. |
| 2004/0018430 | A1 | 1/2004 | Holman et al. |
| 2005/0053834 | A1 | 3/2005 | Fan et al. |
| 2005/0234177 | A1 | 10/2005 | Zaghib et al. |
| 2006/0093920 | A1 | 5/2006 | Cheon et al. |
| 2006/0222946 | A1 | 10/2006 | Okada et al. |
| 2006/0246354 | A1* | 11/2006 | Lee ................. H01M 4/0404 429/246 |

FOREIGN PATENT DOCUMENTS

| | | |
|---|---|---|
| KR | 20030093019 A | 12/2003 |
| WO | WO 97/20768 A1 | 6/1997 |
| WO | WO 03/063287 A2 | 7/2003 |

OTHER PUBLICATIONS

European Search Report issued in European Patent Application No. 07 70 1717, dated Jul. 2, 2013, 7 pages, European Patent Office.

Official Action issued by Chinese Patent Office dated May 2, 2012 in Chinese Application No. 200780003328.7, and English language translation of Official Action (14 pgs).

Desilvestro et al., Metal Oxide Cathode Materials for Electrochemical Energy Storage: A Review, Jan. 1990, J Electrochem Soc, vol. 137, No. 1, 5C-22C.

Terada, T. et al."Study of Mn dissolution from $LiMn_2O_4$ spinel electrodes using in situ total reflection X-ray fluorescence analysis and fluorescence XAFS technique"Journal of Power Sources 97-98, 2001, pp. 420-422.

Nakai I. et al."In situ XAFS study of the electrochemical deintercalation of Li from $Li_{1-x}Mn_{2-y}Cr_yO_4$ (y= 1/9, 1/6, 1/3)" Journal of Power Sources 97-98, 2001, pp. 412-414.

Lu, C. et al."Influence of the particle size on the electrochemical properties of lithium manganese oxide" Journal of Power Sources 97-98, 2001, pp. 458-460.

* cited by examiner

COATED METAL OXIDE PARTICLES WITH LOW DISSOLUTION RATE, METHODS FOR PREPARING SAME AND USE THEREOF IN ELECTROCHEMICAL SYSTEMS

CROSS REFERENCE TO RELATED APPLICATIONS

The present application is a continuation of U.S. application Ser. No. 12/162,095, filed on Jul. 24, 2008, which is a national stage entry of International Application No. PCT/CA2007/000091, filed on Jan. 24, 2007, which claims the benefit of Canadian Application No. 2,534,243, filed on Jan. 25, 2006. The entire contents of each of U.S. application Ser. No. 12/162,095, International Application No. PCT/CA2007/000091, and Canadian Application No. 2,534,243 are hereby incorporated herein by reference in their entirety.

FIELD OF THE INVENTION

The present invention relates to particles comprising a core based on an acidic metal oxide, the surface of which is at least partially covered with a polymer having an electrochemical stability of greater than 3.7 volts.

The present invention also relates to processes for preparing a mixture of these particles, especially incorporating steps of mixing the constituents of the particles.

These particles have the advantage of having a low degree of solubility of the metal oxide present in the core, even after having been subjected to a large number of electrochemical cycles.

Among the many possible applications for the particle mixtures of the invention, mention may be made of the covering of electrode supports. The electrodes thus obtained are particularly stable in operation and may thus be advantageously used in high-performance electrochemical systems.

The electrodes and generators thus obtained are also a subject of the present invention, as are the processes for preparing the electrodes and generators of the invention.

BACKGROUND

The document "Study of Mn dissolution from $LiMn_2O_4$ spinel electrodes using in situ total reflection X-ray fluorescence analysis and fluorescence XAFS technique" by Yasuko Terada in Journal of Power Sources 97-98 (2001), pages 420-422, thus demonstrates the phenomenon of dissolution of $LiMn_2O_4$ oxides in storage batteries and the loss of capacity resulting therefrom.

The document "In situ XAFS study of the electrochemical deintercalation of Li from $Li_{1-x}Mn_{2-y}CrO_4$" by Izumi Nakai et al. in Journal of Power Sources 97-98 (2001), pages 412-414, also describes the phenomenon of dissolution of metal oxide and proposes to partially overcome the instability of the structure by the partial substitution of Mn with Cr, Co or Ni. This technique proves to be complex and has drawbacks due to the fact that it requires a novel synthesis and adjustment of the dopant such that the structure is electrochemically stable.

The document "Influence of the particle size on the electrochemical properties of lithium manganese oxide" by Chung-Hsin Lu et al. in Journal of Power Sources 97-98 (2001), pages 458-469, demonstrates the role played by the size of the lithium manganese oxide particles on the specific capacity values and on the coulombic efficacy of lithium-manganese metal oxide particles.

In recent years, the commercial interest in metal oxides such as $LiV_3O_8$, $V_2O_5$ and $LiMn_2O_4$ as constituent and functional components of electrochemical systems has been very limited. This limitation arises especially from the low stability of the metal oxides in the context of charging-discharging cycles and the substantial losses in performance resulting therefrom.

There is thus a need to upgrade such metal oxides considered as unstable, especially those that have good electrochemical properties, such as $LiMn_2O_4$ and $LiV_3O_8$, and moderate production costs, especially on account of their particular natural abundance.

SUMMARY

A first subject of the present invention consists of particles comprising a core and a coating that covers at least part, preferably at least 80%, even more preferentially at least 90% and most advantageously 100% of the surface of said core, said particle being characterized in that:
said core is preferably composed to at least 90% and even more preferentially to at least 94% by weight of an acidic metal oxide, with a pH preferably of less than 6.5, and even more preferentially with a pH of between 3 and 6;
the coating of the core being based on a polymer, preferably based on a salified polymer, whose electrochemical stability is greater than or equal to 3.7 volts;
the mean thickness of the coating is preferentially between 500 nanometers and 2 micrometers and the coated core has a mean size $d_{50}$ preferably of between 500 nanometers and 40 micrometers, and even more preferentially this size is between 2 and 20 micrometers; and
the degree of solubility (ds), for a given time, of the metal oxide migrating toward the electrolyte, per cycle, is less than 5 per 10 000, and this degree is preferably between 2 and 4.5 per 10 000.

According to one advantageous embodiment of the invention, the polymer used to prepare the coating is preferably chemically stable, or very stable, or even extremely stable.

Preferably, the electrochemical stability of the polymer used for the coating is between 3.75 and 5 volts.

A preferential subfamily of particles of the invention consists of particles whose metal oxide is chosen from the group constituted by $LiMn_2O_4$, $V_2O_5$, $LiMn_{(2-x)}V_xO_4$ with x ranging from 0 to 1 limits inclusive, $V_6O_{13}$ and $LiV_3O_8$, and the metal oxide is more preferentially $LiV_3O_8$.

According to one advantageous variant, the core of the particle comprises from 1% to 12% and preferably from 6% to 10% by weight of a carbon preferably chosen from the group constituted by ethylene black, natural graphite, artificial graphite, Shawinigan carbon, Ketjen carbon, and mixtures of at least two thereof.

Another advantageous subfamily of particles of the invention may be constituted by particles whose core is based on one or more salified polymers, preferably based on at least one polymer salified with at least one salt chosen from the group constituted by salts of the type LiFSI, LiTFSI, LiBETI, LiDCTA, $LiBF_4$ and $LiPF_6$; and 10% maximum of fillers preferably chosen from the group constituted by $SiO_2$, $ZrO_2$ and $Al_2O_3$, and mixtures of at least two thereof.

Advantageously, the polymer constituting the coating may be electrically conductive, and may preferably be based on a polymer chosen from the group constituted by polyanilines, preferably from the group of polyanilines with an average molecular weight of greater than 1000 and preferably between 2500 and 50 000.

The polymer constituting the coating may be electrically nonconductive and may be advantageously chosen from the group constituted by nonconductive polymers of multi-branch type.

Preferably, the electrically nonconductive polymer contains at least 3 branches, and is even more preferentially of 4-branch type, such as those described in the international patent application published on Jul. 31, 2003 under WO 03/063287 (and more particularly on pages 5, 8 and 9), filed in the name of Hydro-Quebec, and also in columns 1 and 2 of American patent U.S. Pat. No. 6,190,804 (Ishiko et al.) and which have acrylate (preferably methacrylate) and alkoxy (preferably alkoxy containing from 1 to 8 carbon atoms, even more preferentially methoxy or ethoxy), or vinyl hybrid end groups.

Advantageously, the metal oxide may be a (50:50) mixture of $LiV_3O_8$ and $V_2O_5$.

Another advantageous subfamily of particles of the invention may be constituted by particles comprising an $LiV_3O_8$ metal oxide core 5 microns in size, covered over 80% of its surface with a coating constituted by the polymer of 4-branch type and with a mean thickness of between 10 nanometers and 5 micrometers and preferably between 15 nanometers and 2 micrometers, characterized by ads of less than 5%.

Another advantageous subfamily of particles of the invention may be constituted by particles comprising a $V_2O_5$ metal oxide core 5 micrometers in size, covered over 80% of its surface with a coating constituted by the 4-branch polymer and with a mean thickness of between 10 nanometers and 5 micrometers and preferably between 15 nanometers and 2 micrometers, characterized by ads of less than 4%.

A second subject of the present invention consists of a process for preparing a homogeneous mixture of particles according to the first subject of the invention.

The preparation may advantageously be performed by mixing the polymer and a metal oxide, via the dry route without any addition of solvent, preferably in weight proportions of from 10% to 90% and preferably from 40% to 80% for each of the constituents of the mixture, the amount of metal oxide present in the mixture preferably being greater than that of the polymer.

The preparation may also be performed by homogeneous mixing of particles according to the first subject of the invention, in which the mixing is performed:
  by preparing a mixture of the polymer and of a metal oxide, preferably in weight proportions of from 10% to 90% and preferably from 40% to 80% for each of the constituents of the mixture; preferably, the amount of metal oxide present in the mixture is greater than that of the polymer; and
  with addition to the solvent of at least one solvent chosen from the group constituted by acetone, acetonitrile, toluene, MEK, NMP or mixtures of at least two thereof; preferably, the solvent used represents by volume from 10% to 80% and more preferentially from 20% to 70% of the total volume of the solvent and of the mixture.

Advantageously, the mixing may be performed by ball milling, sand milling, HEBM (Hot Electron Bolometer Mixer), mechanofusion, in an Agglomaster or Nobita® mixer, or by using at least two of these techniques, preferably at a temperature of between 10 and 40° C., and advantageously in the presence of an inert gas chosen from the group constituted by nitrogen, argon or dry air.

A third subject of the present invention consists of electrodes constituted by an electrode support, said support preferably being made of a metallic material or of a conductive plastic material, and at least partially covered, preferably homogeneously, with a mixture constituted by at least 40% and preferably from 50% to 80% by weight of particles defined in the first subject of the invention or obtained by one of the processes defined in the second subject of the invention.

Preferably, in the electrodes of the invention, at least one polymer is a binder for said electrode by creating bridges between the electrode support, the metal oxide-based particles and the polymer-based coating.

Advantageously, the binding polymer may be a mixture of a coating polymer of high stability and of binding nature and of a binding polymer (polymer that binds the particles in the cathode) other than the polymer present in the coating.

Preferably, the binding polymer may consist solely of a coating polymer of high electrochemical stability.

According to one advantageous embodiment of the invention, the electrodes may comprise at least one polymer containing at least one lithium salt and at least one carbon with a specific surface area of greater than or equal to 1 $m^2/g$, preferably, with a specific surface area of greater than 50 $m^2/g$.

Preferably, the (polymer-oxide-salt-carbon) mixture is prepared without addition solvent, advantageously by using the doctor blade method and/or by extrusion.

According to another advantageous embodiment, the (polymer-oxide-salt-carbon) mixture is prepared with addition of a solvent preferably chosen from the group constituted by acetone, acetonitrile, toluene, MEK, VC, DEC, DMC, EMC, DME or mixtures of at least two thereof, preferably by using the doctor blade method and/or by extrusion.

Advantageously, the composition of the polymer may represent from 1% to 70% by weight relative to the total weight of the (polymer+salt+oxide+carbon) mixture.

Electrodes in which the composition of the carbon represents from 1% to 10% by weight relative to the total weight of the (polymer+salt+oxide+carbon) mixture are particularly advantageous.

Preferably, the concentration of the salt, present in the (polymer-oxide-salt-carbon) mixture, and expressed relative to the polymer, is between 0.1 M and 3 M and preferably between 0.7 M and 2 M.

Another family of electrodes of the invention may be constituted by electrodes in which the carbon, present in the (polymer-oxide-salt-carbon) mixture is a mixture of a first carbon of graphite nature with a specific surface area of less than 50 $m^2/g$ and of a second carbon of non-graphite type with a large surface area, the specific surface area of which is greater than 50 $m^2/g$; the specific surface area is measured according to the BET method.

Advantageously, the carbon present in the electrode is of VGCF carbon fiber, Ex mesophase or PAN (polyacronitrile) type.

Preferentially, in the electrode, the salt is dissolved in the polymer and is chosen from the group constituted by LiFSI, LiTFSI, LiBETI and $LiPF_6$ and mixtures of at least two thereof.

A fourth subject of the present invention consists of processes for preparing one of the electrodes defined in the third subject of the present invention.

According to one advantageous embodiment, an oxide-polymer-salt-carbon liquid mixture may be spread onto a current collector of metal type by extrusion or with a doctor blade, slot die or coma.

According to one advantageous embodiment, the polymer may be of the four-branch type preferably with at least two branches capable of giving rise to crosslinking, and it is converted into a polymer matrix, optionally in the presence of an organic solvent, by crosslinking after spreading the mixture onto the electrode support.

The crosslinking may be advantageously performed without addition a crosslinking agent other than the metal oxide.

According to another advantageous variant, the polymer may be of EG type, preferably with at least two branches capable of giving rise to crosslinking, and it is converted into a polymer matrix, optionally in the presence of an organic solvent, by crosslinking after spreading the mixture onto the electrode support.

A fifth subject of the present invention consists of a process for preparing electrochemical generators comprising at least one anode, at least one cathode and an electrolyte, in which at least one of the electrodes is as defined in the third subject of the present patent application or as obtained by one of the processes defined in the fourth subject of the present invention.

Advantageously, these processes may be applied to the preparation of electrochemical generators of the lithium generator type and the spread cathode may be introduced into said lithium generator with a dry polymer as electrolyte, the battery not containing any liquid solvent.

According to one advantageous mode, these processes may be applied to the preparation of electrochemical generators in which the electrolyte is constituted of the same material as the binder and as the coating.

Advantageously, the process may be used for the preparation of electrochemical generators in which the electrolyte:
 is constituted of a material other than that which constitutes the binder and/or the coating; and/or
 also acts as separator and is constituted by a dry polymer with an electrochemical stability of greater than 3.7 volts; and/or
 also acts as separator and is constituted by a dry polymer with an electrochemical stability of less than 3.7 volts.

Advantageously, the process may be used for the preparation of electrochemical generators in which:
 the anode is of lithium or lithium alloy or carbon, graphite, carbon fiber, $Li_4Ti_5O_{12}$ or $WO_2$ type, preferably lithium metal or slightly alloyed lithium; and/or
 the lithium is alloyed with Al, Sn, carbon, Si or Mg and the content of alloyed metals is greater than 50 ppm and preferably greater than 500 ppm.

A sixth subject of the present invention consists of electrochemical generators obtained by performing one of the processes defined in the fifth subject of the present invention.

Another advantageous family of generators of the invention may consist of those comprising particles as defined in the first subject of the invention or as obtained by performing a process according to the second subject of the invention.

A seventh subject of the present invention consists of the use of a generator as defined in the sixth subject of the present invention, in an electrical vehicle, in a hybrid vehicle, in telecommunications, in UPSs and in electrochromic devices.

An eighth subject of the present invention consists of processes for reducing the solubility of metal oxides in electrochemical systems, which consists in increasing the pH of the oxide, preferentially by selecting the nature and the amount of the carbon mixed with the oxide particles, more particularly by coating the oxide particles with a polymer, based on PEO, polyacrylonitrile, PMMA and/or PVC dissolved in a solvent (acetonitrile, water, acetone, methanol, etc.) and then by drying the composition and carbonizing it at a temperature of about 600-700° C., under an inert atmosphere for 8-12 hours; the amount and type of the polymer used being linked to the residual content of carbon present at the surface of the oxide particles, and the mixing of the oxide and the polymer solution possibly being advantageously performed with a Jar mill, a bar mill or a paint mixer.

DETAILED DESCRIPTION OF PREFERRED EMBODIMENTS

Figure 1:
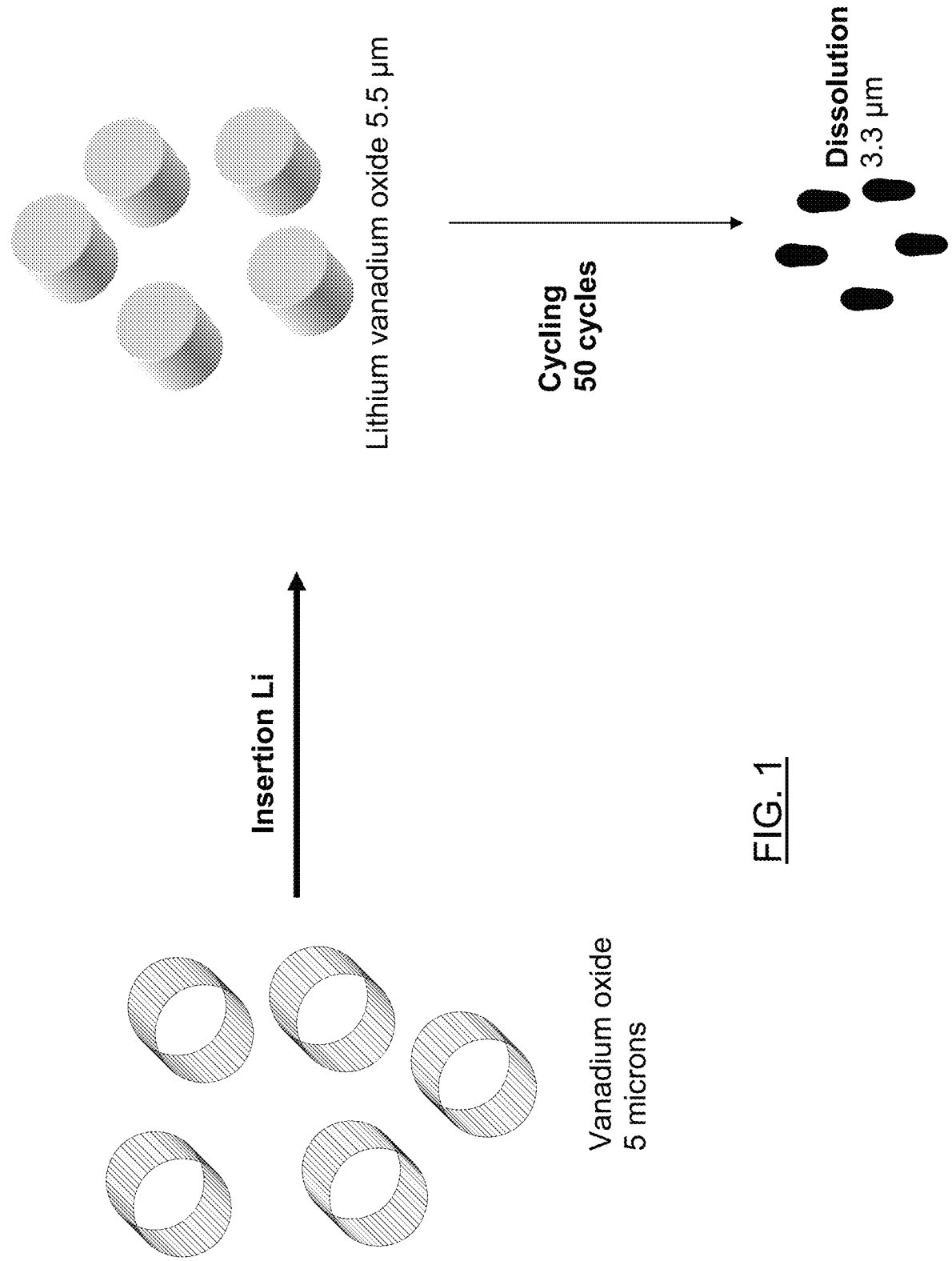
FIG. 1 illustrates the dissolution phenomenon observed for small uncoated particles based on lithium vanadium oxide and of formula $LiV_3O_8$.

As used in the context of this specification, the term "salified polymer" refers to a polymer that contains a salt such that the polymer is salified by at least one salt chosen from the group constituted by salts of the type LiFSI, LiTFSI, LiBETI, LiDCTA, LiBF$_4$ and LiPF$_6$.

As used in the context of this specification, the term "electrochemical stability" corresponds to the window of stability of the polymer; outside this window, the polymer degrades.

As used in the context of this specification, the term "3-branch polymers" relates, as illustrated in the document "Relationship between Structural Factor of Gel Electrolyte and Characteristics of Electrolyte and Lithium-ion Polymer Battery Performances" by Hiroe Nakagawa et al., The 44th Symposium in Japan, Nov. 4-6, 2003, abstract 3D26, to three-branch polymers which have the form of a 3-branch comb. The 3 substantially parallel branches of these polymers are preferably attached to the center and to the two ends of a small backbone, preferably containing 3 atoms, preferably 3 carbon atoms, in the chain.

In the case of a chain containing 3 carbon atoms, each of these atoms is connected to a branch.

Among these 3-branch polymers, and in the context of the present invention, the ones that are preferred are those with an average molecular weight (MW) ranging from 1000 to 1 000 000 and even more preferentially those whose average molecular weight ranges from 5000 to 100 000.

As used in the context of this specification, the term "four-branch polymers" is related to the abovementioned patent application WO 03/063287, which is incorporated by reference into the present patent application, which describes a preferential family of four-branch polymers.

Such polymers have the form of a 4-branch comb. The 4 substantially parallel branches of these polymers are attached, respectively, between the two ends (preferably attached symmetrically to the chain) and to the two ends of a small chain, preferably constituted by a chain comprising 4 atoms, which are preferably 4 carbon atoms.

In the case of a chain containing 4 carbon atoms, each atom is connected to a branch.

Such polymers preferably have hybrid end groups, more preferentially acrylate (preferably methacrylate) and alkoxy (preferably alkoxy with from 1 to 8 carbon atoms, even more preferentially methoxy or ethoxy), or vinyl hybrid end groups, at least one branch of said four-branch polymer (and preferably at least two branches) being capable of giving rise to crosslinking.

Preferably, the four-branch polymer is one of those defined in columns 1 and 2 of the abovementioned American patent U.S. Pat. No. 6,190,804, which is incorporated by reference into the present patent application.

This polymer is preferentially a star polymer of polyether type which contains at least four branches having end groups containing the following functions: acrylate or methacrylate and alkoxy, allyloxy and/or vinyloxy, of which at least one, and preferably of which at least two, of these functions are active to allow crosslinking.

Other families of polyethers whose molecular mass is greater than or equal to 30 000 are advantageously used in the context of the present invention.

According to one preferential embodiment of the present invention, the 4-branch polymer is a tetrafunctional polymer preferably with a high molecular weight, corresponding to formula (I):

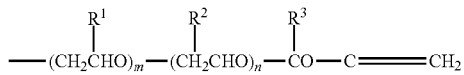

in which $R^1$ and $R^2$ each represent a hydrogen atom or a lower alkyl (preferably from 1 to 7 carbon atoms); $R^3$ represents a hydrogen atom or a methyl group; m and n each represent an integer greater than or equal to 0; in each high molecular weight chain, m+n>35; and each of the groups $R^1$, $R^2$ and $R^3$ and each of the parameters m and n may be identical or different in the 4 high molecular weight chains.

Among these four-branch polymers, those with an average molecular weight of between 1000 and 1 000 000 and even more preferentially those with an average molecular weight ranging from 5000 to 100 000 are particularly advantageous.

According to another preferential mode, polyethers of star type of at least four branches with a hybrid end group (acrylate or methacrylate and alkoxy, allyloxy or vinyloxy) are selected. The stability voltage thereof is markedly greater than 4.

In addition, the vinyl polymers of EG type and more particularly those described in the patent application published under EP-A-1 249 461 (Wendel et al.), which is incorporated by reference into the present patent application, are of particular interest as protective material. Among these polymers, those whose average molecular weight ranges from 600 to 2500 are particularly advantageous.

Polymers of this family may advantageously be obtained by reacting ethylene oxide and 2,3-epoxy-1-propanol with the starting material, or by reacting 2,3-epoxy-1-propanol with ethylene glycol as starting material to produce a polymer compound. This step is followed by the introduction of polymerizable and/or nonpolymerizable functional groups at each end of a backbone and side chains into the resulting polymer compound.

Compounds containing one or more active hydrogen and alkoxide residues may also be used as starting materials.

Examples of active hydrogen residues for the compound containing one or more active hydrogen residues include the group of hydroxyls, preferably containing from 1 to 5 active hydrogen residues. Specific examples of compounds containing one or more active hydrogen residues include triethylene glycol monomethyl ether, ethylene glycol, glycerol, diglycerine and pentaerythritol, and derivatives thereof.

Specific examples of alkoxides also include NaOCH$_3$ and t-BuOK, and derivatives thereof.

The polyether polymer compounds of the invention have the structural unit represented by formula (1) and also the structural unit represented by formula (2) and/or the structural unit represented by formula (3). The number of structural units represented by formula (1) in a molecule is from 1 to 22 800, more advantageously from 5 to 11 400 and even more advantageously from 10 to 5700. The number of structural units of formula (2) or (3) (but when both are included, it is the total number) is from 1 to 13 600, more advantageously from 5 to 6800 and even more advantageously from 10 to 3400 and also in a molecule.

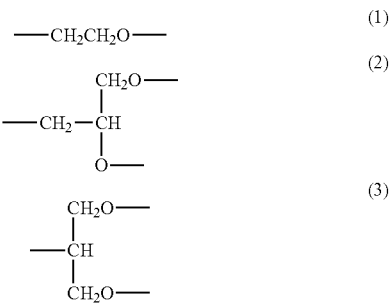

Examples of polymerizable functional groups introduced at each molecular end include (meth)acrylate residues, allyl groups and vinyl groups, and examples of nonpolymerizable functional groups include alkyl groups or functional groups comprising boron atoms.

As alkyl groups above, alkyl groups containing from 1 to 6 carbon atoms are advantageous, those containing from 1 to 4 carbon atoms are more advantageous, and methyl groups are especially advantageous.

Examples of functional groups comprising boron atoms include those represented by formula (4) or (5) below:

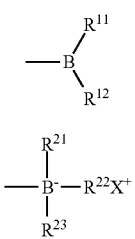

$R^{11}$ and $R^{12}$ in formula (4) and $R^{21}$, $R^{22}$ and $R^{23}$ in formula (5) may be identical or different, and each represents a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureido, acyl, oxycarbonyl, carbamoyl, sulfonyl, sulfinyl, oxysulfonyl, sulfamoyl, carboxylate, sulfonate, phosphonate, heterocyclic, —B($R^a$) ($R^b$), —OB ($R^a$) ($R^b$) or OSi($R^a$)($R^b$)($R^c$). ($R^a$), ($R^b$) and ($R^c$) each represent a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureido, acyl, oxycarbonyl, carbamoyl, sulfonyl, sulfinyl, oxysulfonyl, sulfamoyl, carboxylate, sulfonate, phosphonate, heterocyclic or derivatives thereof. $R^{11}$ and $R^{12}$ in formula (4) and $R^{21}$, $R^{22}$ and $R^{23}$ in formula (5) may be linked together to form a ring, and the ring may bear substituents. Each group may also be substituted with substitutable groups. Furthermore, $X^+$ in formula (5) represents an alkali metal ion, and is advantageously a lithium ion.

The ends of the molecular chains in the polyether polymer may all be polymerizable functional groups, nonpolymerizable functional groups, or may include both.

The average molecular weight (MW) of this type of polyether polymer compound is not especially limited, but it is usually from about 500 to 2 million and advantageously from about 1000 to 1.5 million.

The polymers of these preferential families are moreover advantageously chosen from polymers that may be cross-linked by ultraviolet, infrared, heat treatment and/or an electron beam ("e-beam").

According to the invention, it has been discovered, unexpectedly, that the acidic or basic nature of a metal oxide greatly influences its stability. Thus, soluble oxides such as $LiV_3O_8$ and $V_2O_5$ generally prove to have acidic pHs, whereas insoluble oxides such as $LiFePO_4$ and $LiCoO_2$ prove to have basic pHs.

Table I shows a few pH values for the metal oxides $LiV_3O_8$ and $LiCoO_2$, in the presence of variable amounts of carbon, mixed with the oxide. The pH was measured using the method defined below.

TABLE I

| Test | Oxide | Ketjen (% W) pH = 10.6 | Carbon (W %) pH = 8.2 | Sampling time | pH | Color |
|---|---|---|---|---|---|---|
| 1 | $LiV_3O_8$ | 5 | | 30 | 4.52 | Yellow |
| 2 | $LiV_3O_8$ | 3.75 | | 30 | 4.44 | Yellow |
| 3 | $LiV_3O_8$ | 2.5 | 2.5 | 30 | 5.5 | Yellow |
| 4 | $LiFePO_4$ | 5 | | 30 | 10.1 | Colorless |
| 5 | $LiFePO_4$ | 3.75 | | 30 | 10.06 | Colorless |
| 6 | $LiFePO_4$ | 2.5 | 2.5 | 30 | 10.04 | Colorless |
| 7 | $LiFePO_4$ | | | 30 | 9.9 | Colorless |
| 8 | $LiCoO_2$ | | | 30 | 8.6 | Colorless |

According to the invention, it has also been discovered that coating with a particular polymer makes it possible very substantially to improve the stability of metal oxide particles at acidic pH.

Specifically, the difficulties encountered with soluble metal oxides were solved by the method described below, which is in accordance with the main concept of the invention, which consists in coating the stable metal oxide particle with a polymer of particular nature.

Thus, for example, the $LiV_3O_8$ particles are protected by coating them with a polymer that is chemically and/or electrochemically stable in its electrochemical window, i.e. with an electrochemical stability of greater than or equal to 3.7 volts.

The polymers used to prepare the coating are preferably of polyether type, more preferentially of multibranch or hyperbranched type, in particular those synthesized by the company DKS and described in patent U.S. Pat. No. 6,190,804, which is incorporated into the present patent application by reference.

These polymers are preferably salified with at least one salt of LiFSI, LiTFSI, LiBETI, $LiBF_4$ or $LiPF_6$ type. A mixture (polymer—with at least one salt) that is liquid at room temperature is preferably used to coat the oxide particles.

According to one advantageous embodiment of the invention, the metal oxide particles are coated via one of the following methods or via a combination of at least two of the methods: ball milling; jar milling; HEBM (High Energy Ball Milling); mechanofusion; using the Nobulta device sold by the company Hosokawa, Japan; Aggolmaster; and pebble mill.

The coating of the oxide may be performed via several methods, with or without solvent.

The salified polymer coating the oxide particles has numerous roles. Its first role is that of ensuring the nondissolution of the metal oxide, such as $LiV_3O_8$. Its second role is that of binder, between the oxide particles present in the cathode spreading solution, for example on an aluminum support. The third role is that of ensuring the ion conductivity of the salt, between the particles, and across the separator.

The following parameters, relating to the nature of the polymer used to prepare the coating, play an important role in the stability, i.e. in the low dissolution of the acidic metal oxide:

the electrochemical stability;
the chemical stability of the polymer; and
the conductive or nonconductive nature.

The various methods used for quantifying the various parameters of the polymers used to prepare the metal oxide particle coating and to evaluate the stability of the particles of the invention are defined below.

Method for Measuring the pH of the Metal Oxide

The pH of the metal oxide represents the value measured, using a standard glass electrode, in an aqueous solution of the oxide obtained by dissolving, under standard temperature and pressure conditions, 0.15 grams of the oxide in 10 ml of water. The solution is left to stand for one week under standard temperature conditions, and is then stirred just before taking the measurement with an Oakton 2100 series machine, sold by the company Oakton. In the context of the present invention, any sample whose pH is less than 7 is classified as being an acidic metal oxide.

It is noted that the nature and the percentage of the carbon present in the mixture (carbon-metal oxide) has an influence on the pH value; this value differs more or less substantially from that of the metal oxide alone. This parameter may be used to improve the stability of the metal oxides.

In order to reduce the solubility and thus to increase the pH of the oxide, the following particular method for coating oxide particles with carbon is preferred. The oxide powder is coated with a polymer, based on PEO, polyacrylonitrile, PMMA and/or PVC dissolved in a solvent (acetonitrile, water, acetone, methanol, etc.). Next, the composition is dried and then carbonized at a temperature of about 600-700° C. under an inert atmosphere for 8-12 hours. The amount of polymer used is related to the residual content of carbon present at the surface of the oxide particles. The mixture of oxide and polymer solution may be prepared in a jar mill, a ball mill or a paint mixer.

It was demonstrated that the soluble oxides generally have acidic pHs, whereas the insoluble oxides such as $LiFePO_4$ and $LiCoO_2$ have basic pHs.

It was also discovered that the pronounced instability observed for the metal oxides of acidic nature, present in electrochemical systems, manifests itself by a migration of the soluble species to the anode while crossing the electrolyte and the passivation films positioned on the anode.

This negative phenomenon of dissolution of the metal oxide and of formation of dendrites considerably reduces the physicochemical properties of the passivation films. This phenomenon is visualized in FIG. 3, which shows the functioning of the cell and the diagram of uncontaminated lithium metal. This conclusion is directly derived from experimental XPS (X-Ray-Photoelectron Spectroscopy) results, after dissolution of vanadium, which migrates through the solid polymer electrolyte (SPE).

Figure 3:
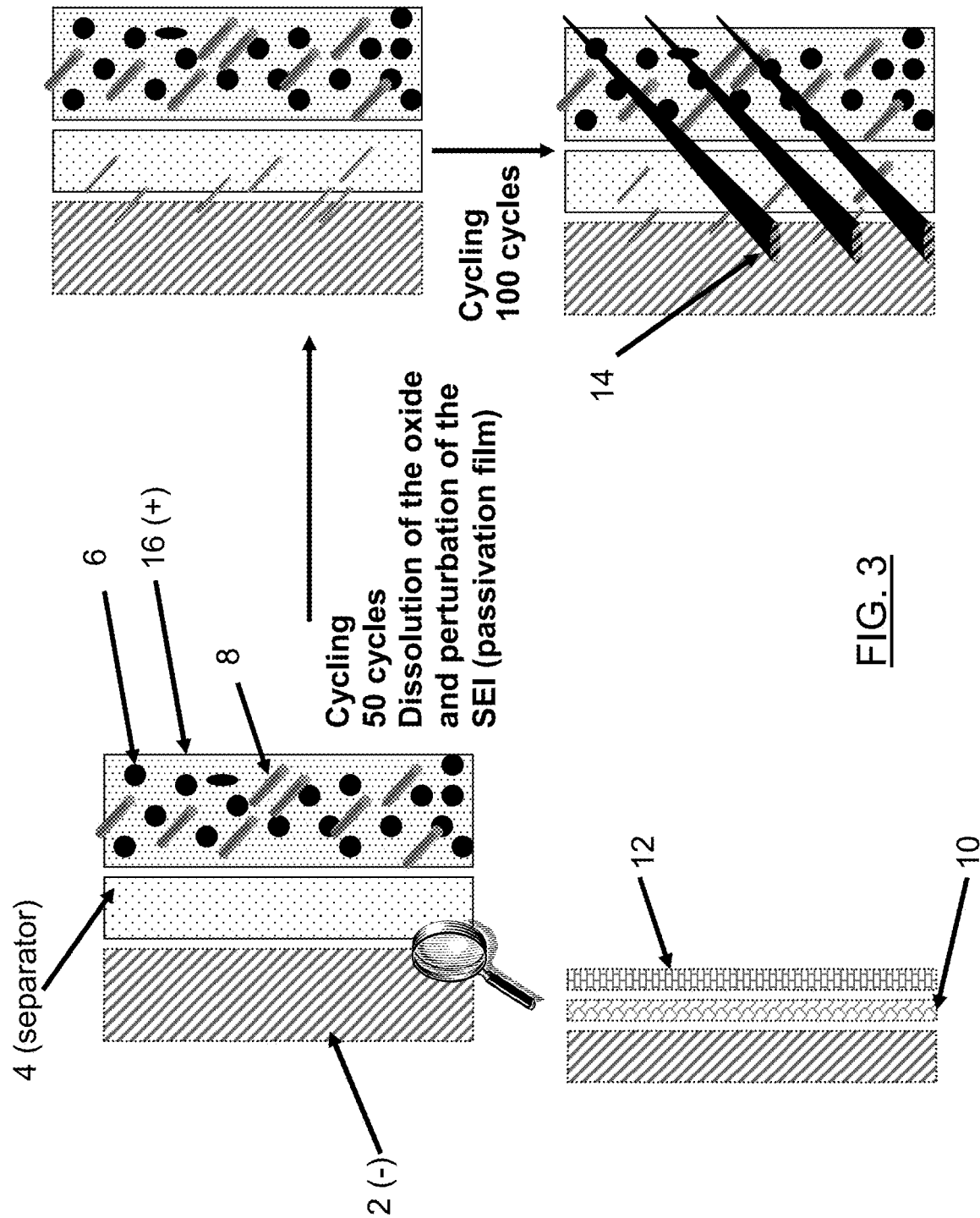
FIG. 3 illustrates the general mechanism of formation of dendrites, during the dissolution of an acidic metal oxide in an electrochemical system of solid polymeric lithium battery type.

FIG. 3 especially illustrates the general mechanism of formation of dendrites, during the dissolution of an acidic metal oxide in an electrochemical system of solid polymer lithium battery type. SPE means Solid Polymer Electrolyte and SEI means Solid Electrolyte Interface (passivation film). The metal oxide particles, initially present only in the cathode, substantially decreased in size in the course of the first 50 cycles and migrated partially into the SPE and into the lithium anode. After 100 cycles, dendrites of the oxide formed. These dendrites extend from the lithium metal to the lithium separator, passing through the electrolyte. The references used in FIG. 3 are: 2 for lithium (negative), 4 for SPE (Solid Polymer Electrolyte—separator), 6 for carbon, 8 for vanadium oxide, 10 for $Li_2O$, 12 for $Li_2CO_3$, 14 for dendrite and 16 for cathode.

A metal of the soluble oxide reacts with the lithium of the passivation film to make it electrically conductive and increases its thickness. The formation of dendrites may result from the piercing of the SPE. Furthermore, when the dendrites reach a certain size, they may touch the cathode, thus creating a short circuit which kills the battery.

The measurements taken with a lithium polymer battery of laboratory type with a surface area of 4 $cm^2$ show that, during cycling, in particular at a high current above C/1 (discharge in 1 hour), no dissolution takes place for the insoluble oxides of basic nature, whereas, at the same current, the soluble oxides dissolve.

Method for Measuring the Electrochemical Stability of the Metal Oxide

This stability is measured by the method developed by the Applicant using the device shown in FIG. 3. A Mac cell is used in potentiostat mode to characterize the electrochemical stability of the materials. This is a slow cyclic voltammetry test. It is considered, when the sweep speed is 10 mV/h, that the material is always in its thermodynamically stable state. The current peaks generated are thus in regions in which there is no electrochemical activity. Degradation of the material takes place in regions in which there is no electrochemical activity of the material. The degradation may intensify, as a function of the voltage, to form an irreversible electrochemical wall.

Figure 6:
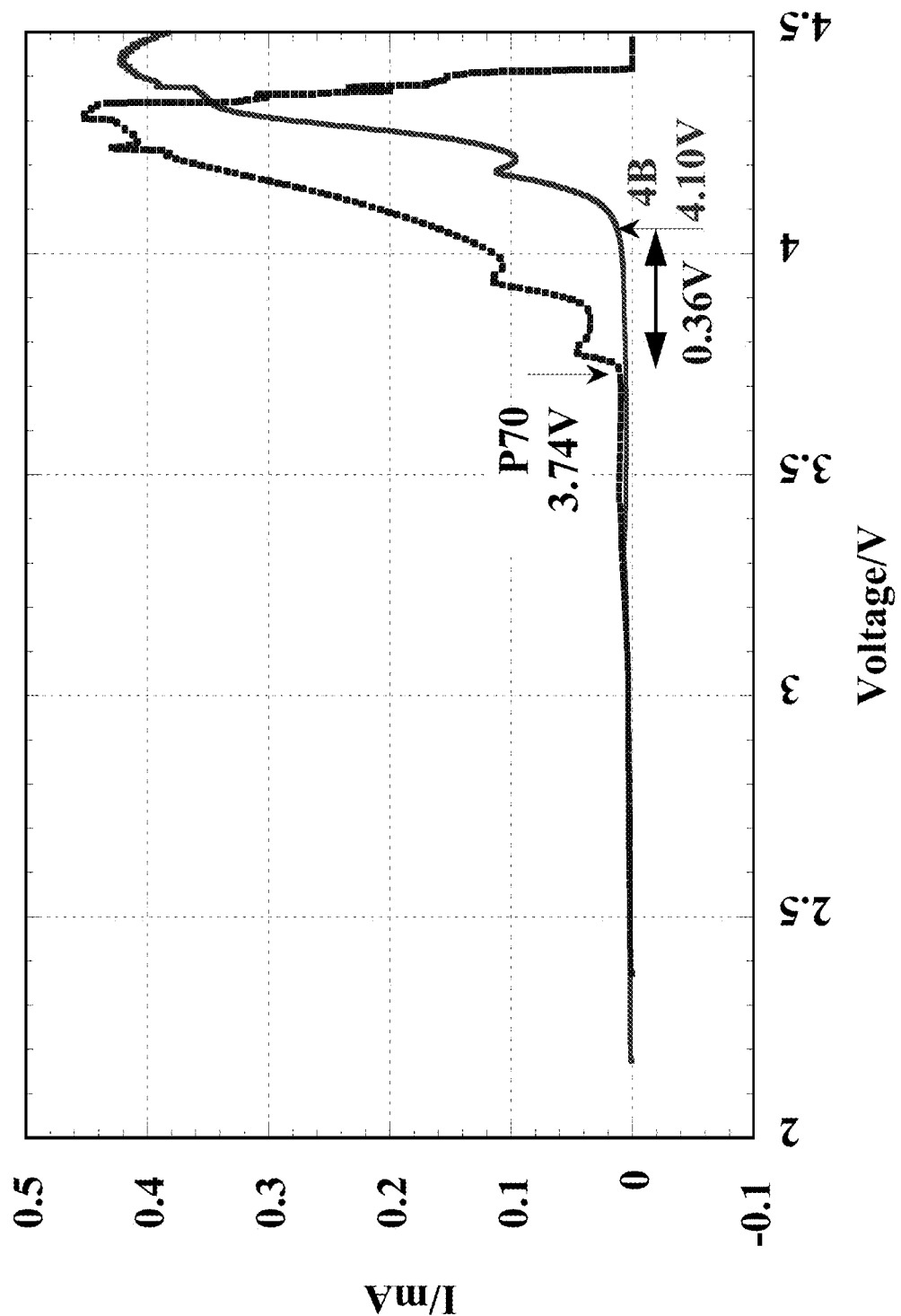
FIG. 6 gives the results, in the form of curves, for the measurement of the stability of $LiV_3O_8$ metal oxide particles coated, respectively, with a polyether polymer with a molecular weight MW of 70 000 in the first case, and with a 4-branch polymer, in the second case.

A curve of degradation of the polymer is shown in FIG. 6. The start of the oxidation wall expresses the stability limit of the polymer. It is by virtue of the carbon electrode of high specific surface area, such as Ketjen or Shawinigan, that the electrochemical stability may be easily measured and the degradation of the polymer detected.

Method for Measuring the Electrochemical Stability of a Polymer

Figure 5:
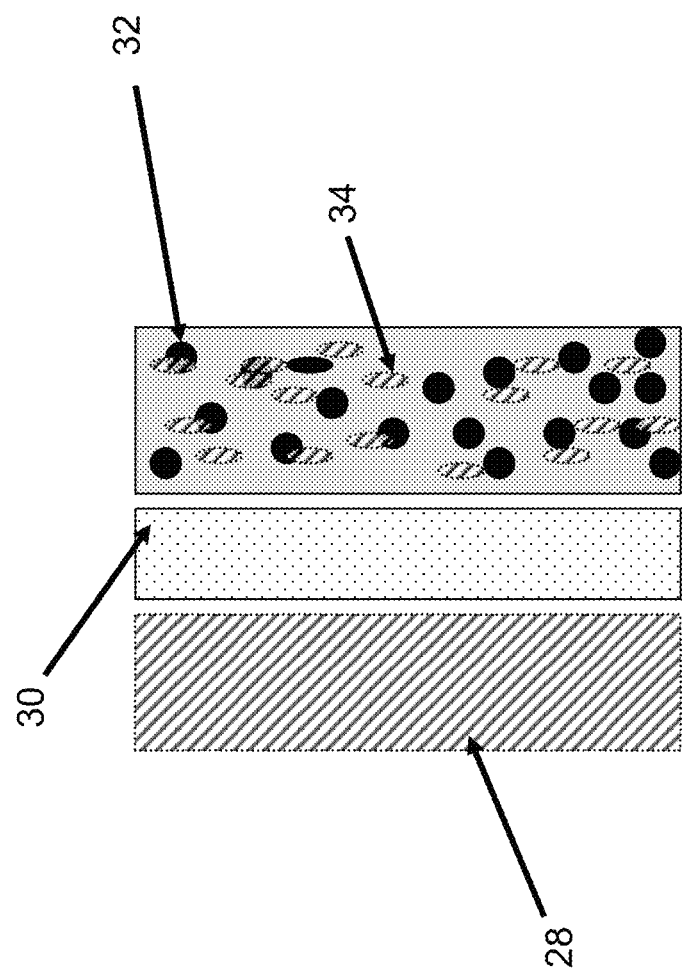
FIG. 5 illustrates the device used for detecting the metal oxide oxidation current and for quantifying the operating voltage limit of the polymer.

To detect the limit of the operating voltage of the polymer with the oxidation current, use is made of the electrochemical method that is already used in the international patent application published under WO 2003/063 287 (which is incorporated into the present patent application by reference), in the name of Hydro-Quebec, and it is performed using the device shown in FIG. 5.

FIG. 5 illustrates the device used for detecting the oxidation current of a metal oxide and for quantifying the limit of the operating voltage of the polymer. The references used in FIG. 5 are: 28 for lithium, 30 for SPE, 32 for Shawinigan carbon and 34 for binder (4-branch polymer).

The cathode used for the measurements is a composite of polymer and of carbon of high surface area spread on an aluminum current collector. By virtue of the surface area developed by the carbon, this material acts as a detector and can detect any oxidation current with an intensity as low as about 2 microamperes. The electrolyte in solid form or in liquid form, saturated in a membrane of microporous polyolefin type, for instance Celgard®, is stable at high voltage.

The anode is composed of lithium metal, which serves as reference electrode and as counterelectrode.

The electrochemical method used is slow cyclic voltammetry performed with a sweep speed of 10 mV/h. This method illustrates the oxidation current as a function of the voltage: each time the current approaches zero, the operating voltage of the polymer is stable.

The value of the electrochemical stability is defined as the value of the voltage applied to the system when the abrupt change in the current/voltage is observed (I function of V).

Model of the Chemical Stability as a Preliminary Test of the Electrochemical Stability of the Coating Polymer The stability of the polymer used as electrolyte in the cathode is determined by preparing a sample of spreading solution containing the oxide, the polymer, the salt and the spreading solvent. A sample of this solution is taken (0.3 gram) and placed in a 40 ml sample bottle, and the solvent is then evaporated off by placing the various samples under vacuum overnight. The sample bottles are sealed, under an argon atmosphere, and then transferred into an oven for treatment at 80° C. Monitoring of the stability of the polymer as a function of time was performed by dissolving the cathode in THF, followed by injecting it after filtration into a GPC system in order to determine the molecular mass and the polydispersity of the extracted polymer. These results are subsequently compared with the results for a polymer that has not undergone any heat treatment.

Figure 7:
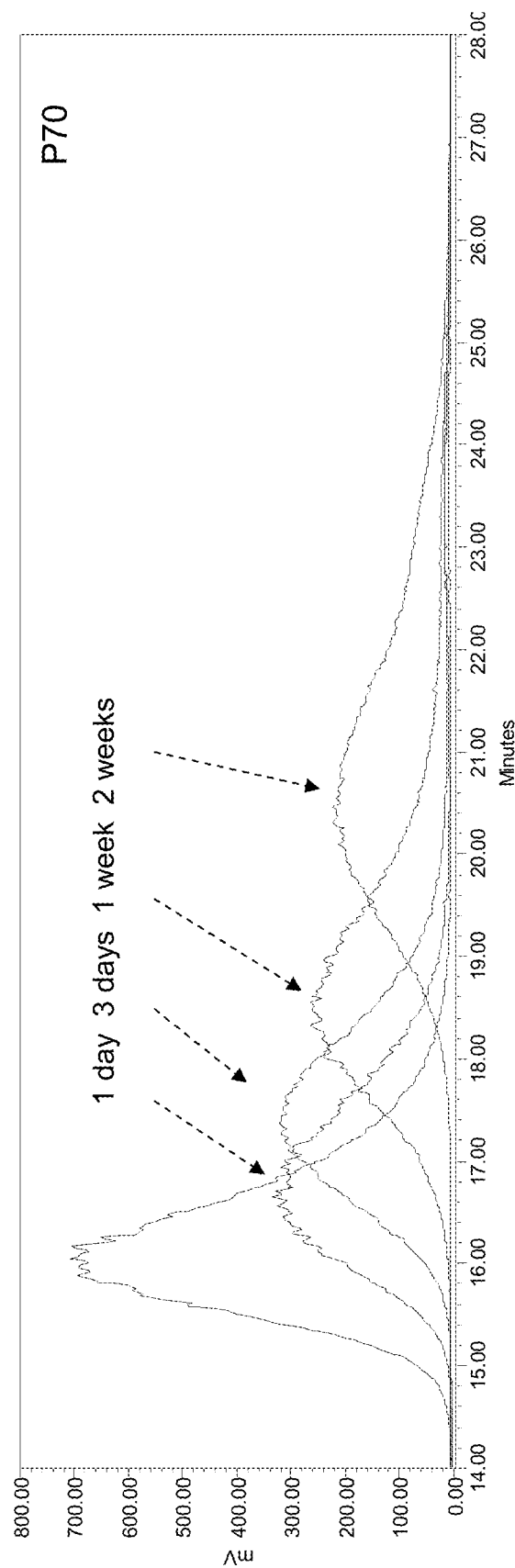
FIG. 7 shows the change in chemical stability of the polyether polymer with a molecular weight MW of 70 000 for a 1-day, 3-day and then 1-week and 2-week heat treatment.
Figure 8:
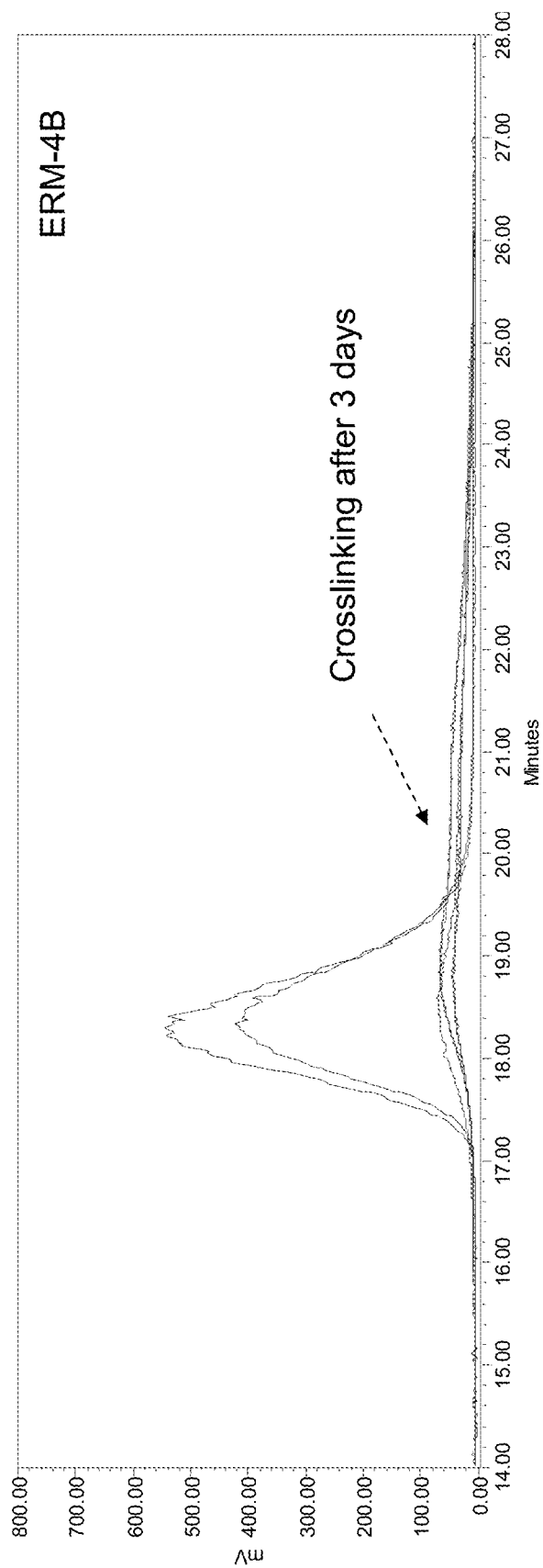
FIG. 8 shows the change in chemical stability of the polymer ERM-4B, which is a four-branch macromonomer with an average molecular weight MW of 10 000 and a viscosity of 3.5 Pa·sec at 25° C. and characterized by a number of acrylate functions per molecule which is 3, for a heat treatment lasting 3 days, the various curves corresponding to stability measurements taken for a 1-day, 3-day and then 1-week and 2-week heat treatment and to the observation of crosslinking.
Figure 9:
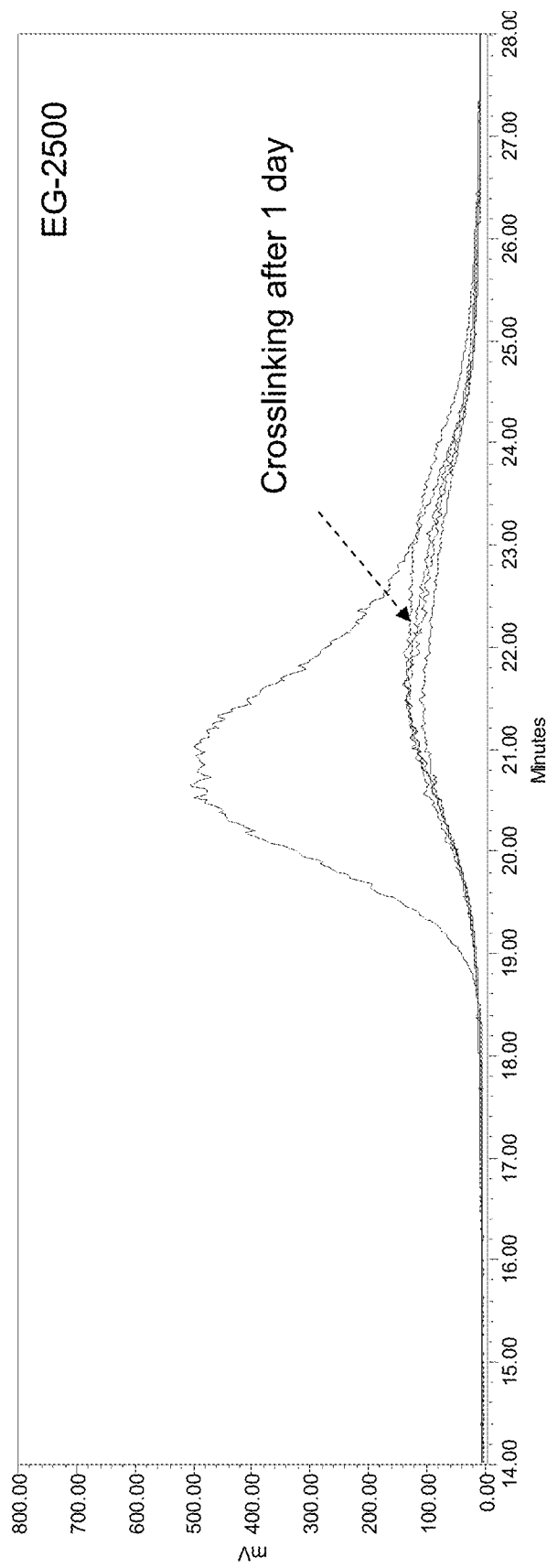
FIG. 9 shows the change in chemical stability of the polymer EG-2500 sold under the brand name Elexcel, which is a polyoxyalkylene glycol acrylate hyperbranched macromonomer in which the number of acryl groups per molecule is 1.5, with an average molecular weight MW of 2500, and which is characterized by a viscosity of 0.3 Pa·sec at 25° C., the various curves corresponding to stability measurements taken for a 1-day, 3-day, and then 1-week and 2-week heat treatment, and also to the observation of crosslinking.

The results are given in FIGS. 7 to 9, in the form of comparative GPC curves. FIG. 7 shows the change in the molecular mass of a standard polymer as a function of time, after heat treatment. This figure shows that after less than two hours, at 80° C., in the presence of vanadium oxide at an OCV (open circuit voltage) of 3.55 volts, the polymer commences significant degradation. This degradation continues until the polymer is totally degraded. This step is reached in less than 2 days.

FIGS. 8 and 9 show the change in the molecular mass of novel polymers (ERM-4B and EG-2500, respectively) under the same degradation conditions. These figures demonstrate, for these two polymers, that the samples of extracted cathodes remain stable over a period of more than 2 hours, at 80° C. Thereafter, a decrease in the level of extraction is observed, although the molecular mass and the polydispersity of the extracted material remain stable. After more than 3 days ERM-4 branch (also known as 4-branch) and one day, respectively, for EG-2500, the polymers are totally crosslinked and show no sign of degradation. Only the by-products associated with the crosslinking reaction are then extracted and analyzed by GPC.

Via these stability analyses, performed at several temperatures, it is possible to conclude that the novel polymers of the type ERM-4B or EG-2500 are markedly more stable to oxidation than a vanadium oxide, and that over time it is possible to crosslink these electrolytes in situ, in the cathode, and that this network remains stable over several weeks at high temperature (80 or 110° C.).

In conclusion, it will be considered that a polymer is chemically stable if the decrease in its molecular weight, after having been subjected to a heat treatment at 80° C. for 1 day, has not decreased by more than 10%.

It is considered, under these conditions, that a polymer is very stable if the decrease in its molecular weight is less than 5% under the same conditions.

A polymer whose decrease in molecular weight, after having been subjected to a heat treatment at 80° C. for 3 weeks, has not decreased by more than 5% is considered as extremely stable.

The chemically stable polymers, preferentially the moderately stable polymers and more preferentially those that are classified, according to this test, as very stable are advantageously used in the context of the present invention to constitute the coating on the soluble metal oxide particles.

Definition of the Degree of Solubility of a Metal Oxide Present in the Cathode of an Electrochemical System In the context of the present invention, the degree of solubility (ds) of the metal oxide, at a given time, refers to the percentage of metal oxide particles initially present in the cathode, which migrate to the electrolyte and to the anode.

An example of implementation of the method for the measurement of the degree of solubility of vanadium oxide and of the method for calculating the degree of dissolution of vanadium is given below.

A view in cross section of a lithium battery (lithium/SPE/cathode) is observed under a microscope before cycling and after cycling.

Before cycling—by means of EDX (energy-dispersive X-ray) coupled to a scanning electron microscope that maps the surface area of the vanadium element in the cathode. This surface area is considered as the 100% reference and, when the vanadium map is analyzed on the separator (SPE) and lithium, no trace or area of vanadium is detected. This is referred to as 0% dissolved vanadium.

After cycling—the mapping area for vanadium on SPE and lithium is 5%, i.e. before cycling, the vanadium map of the cathode corresponds to an area of 15 cm×15 cm=225 $cm^2$. After cycling, the surface area of vanadium found on the SPE and the lithium surface area is 11.5 $cm^2$.

This count makes it possible to evaluate the vanadium content, which is equivalent to 5% of dissolved vanadium.

Definition of the Criterion of Conductivity and/or of Non-conductivity of a Polymer The electrical conductivity of a substance, also known as the capacity of a surface to conduct an electrical current, is defined as being the inverse of the resistivity: $\sigma=1/\rho$. As the intensity of the electrical field in the material is expressed by the relationship $E=V/L$, Ohm's law may be written in terms of current density by the formula $J=\sigma E$. Conductive metals are considered as those for which $\sigma>10^5$ $(\Omega \cdot m)^{-1}$. Semiconductive materials are considered as being those that satisfy the relationship: $10^{-6}<\sigma<10^5$ $(\Omega \cdot m)^{-1}$. Insulating materials are considered as being those that satisfy the relationship $\sigma<10^{-6}$ $(\Omega \cdot m)^{-1}$.

In the context of the present invention, polymers with a conductivity of greater than $10^{-5}$ $(\Omega \cdot m)^{-1}$ are classified as conductive polymers, and polymers with a conductivity of less than or equal to $10^{-6}$ $(\Omega \cdot m)^{-1}$ are classified as nonconductive polymers.

Parameters for Manufacturing Electrochemical Generators Incorporating Coated Metal Oxide Particles of the Invention The generator or electrochemical battery is formed from at least 3 films acting, respectively, as anode, electrolyte and cathode.

Anode—this is a film of lithium or of lithium alloy, or of lithium carbon. Preferably, the film is lithium.

Electrolyte (SPE)—this is a solvent-free dry polymer film. Its nature depends on the oxide of the cathode.

For Oxides Operating from 1 to 3.6 Volts

This case corresponds to the voltage associated with the potential at half-discharge/100 hours, the operating voltage of the oxide is related to the potential at half-discharge in C/100 (discharge in 100 hours).

By way of example: $Li_4Ti_5O_{12}$ (1.5 volts), $LiV_3O_8$ (2.55 volts). In this case, the SPE may be of the same nature as the coating polymer, or of different nature, i.e. characterized by a stability of less than or equal to 3.7 volts.

For the Oxides Operating from 3 to 5 Volts

In this case, the SPE should preferably be of the same nature as the polymer coating the oxide: for example $LiCoO_2$ (3.6 volts) and/or $LiFePO_4$ (3.5 volts).

Cathode—it is formed from a soluble or insoluble oxide; preferably, the oxide is soluble with a coating of stable polymer type with an electrochemical stability of greater than or equal to 3.7 volts.

The binder may be of the same nature as the coating for the oxide, when the oxide potential ranges from 3 to 5 volts.

EXAMPLES

The examples that follow are given purely as illustrations and shall not be interpreted as constituting any limitation of the subjects of the present invention.

Table I above collates the parameters for preparing the particles according to Examples 1 to 11 below.

Example 1

A mixture of Shawinigan carbon (0.91 gram) with a P70 polyether polymer of MW 70 000 (2.63 grams) and with an LiTFSI salt (0.78 gram) is prepared.

This mixture of 3 components is added to 27.3 ml of acetonitrile, and the whole is homogenized in a jar mill for 24 hours.

The solution is spread onto an aluminum support 17 μm thick using the doctor blade method. The electrode thus prepared is dried under vacuum at 90° C. for 24 hours. An electrode 37 micrometers thick is obtained. This electrode is named P70-carb1.

A mixture of Shawinigan carbon (0.73 gram) with a 4-branch polymer Elexcel TA210 (2.06 grams) and with an LiTFSI salt (0.58 gram) is prepared. The 3 components of the mixture are then mixed with 28.9 ml of acetonitrile. The mixture is then homogenized in a jar mill for 24 hours.

The solution is spread onto an aluminum support using the doctor blade method. The electrode obtained is dried under vacuum at 90° C. The thickness of this electrode is 35 microns. This electrode is named 4B-carb1.

The battery is mounted as follows:
lithium/electrolyte 1/4B-carbon 1=cell 1
lithium/electrolyte 2/P70-carbon 1=cell 2

The lithium is constituted by a film 55 microns thick. The electrolyte 1 is of 4-branch nature with a thickness of 20 micrometers. Electrolyte 2 is of P70 nature with a thickness of 20 micrometers.

The batteries Cell1 and Cell2 are placed in an oven at 80° C. and connected to a Mac cell in potentiostat mode. Slow cyclic voltammetry is applied to Cell1 and Cell2, with a sweep speed of 10 mV/h.

The battery Cell1 shows that the 4-branch polymer (FIG. 6) is stable, up to a voltage of 4.1 volts.

The battery Cell2 shows that the polymer P70 (FIG. 6) has a small degradation wave at about 3.3-3.6 volts, which is followed by a first degradation peak at about 3.74 volts.

Example 2—with Polymer P70

8.04 grams of $LiV_3O_8$, 0.43 gram of Ketjen carbon, 325 grams of polymer P70 and 0.90 gram of LiTFSI and 27 ml of acetonitrile are mixed together in a jar mill for 24 hours, after evaporation of the solvent. The results are given in FIG. 7 in the form of a comparative GPC curve. FIG. 7 shows the change in molecular mass of the polymer, as a function of the duration of the heat treatment. This figure shows that after two hours at 80° C., in the presence of vanadium oxide at 3.55 volts, the polymer commences significant degradation. This degradation continues until the polymer is completely degraded, which is finally reached in less than 2 weeks.

Example 3—with 4-Branch Polymer 8 grams of $LiV_3O_8$, 0.42 gram of Ketjen carbon, 3.25 grams of 4-branch polymer and 0.90 gram of LiTFSI are mixed with 27 ml of acetonitrile, for 24 hours in a jar mill.

After evaporation of the acetonitrile at 80° C., the measurements taken on the mixture of particles, which are given in FIG. 8, show the change in the molecular mass of novel polymers 4B, under the same degradation conditions as in Example 2.

The figure shows, for this polymer, that the samples of extracted cathodes remain stable for a period of more than 2 hours at 80° C. Thereafter, a decrease in the degree of extraction is observed, although the molecular mass and the polydispersity of the extracted material remain stable. After more than 3 days, the ERM-4B is totally crosslinked and shows no sign of degradation.

Only the by-products associated with the crosslinking reaction are then extracted and analyzed by GPC.

Example 4—with Polymer EG 2500

8 grams of $LiV_3O_8$, 0.43 gram of Ketjen carbon, 3.25 grams of polymer EG-2500 and 0.90 gram of LiTFSI are mixed with 27 ml of acetonitrile in a jar mill, for 24 hours.

After evaporation of the acetonitrile at 80° C., the measurements taken and given in FIG. 8 show the change in the molecular mass of the polymer EG-2500, under the same degradation conditions as in Examples 2 and 3. The figure moreover shows, for this polymer, that the samples of extracted cathodes remain stable for a period of more than 2 hours at 80° C. Thereafter, a decrease in the degree of extraction is observed, although the molecular mass and the polydispersity of the extracted material remain stable. After more than one day, the polymer EG-2500 is totally crosslinked and shows no sign of degradation.

Only the by-products associated with the crosslinking reaction are then extracted and analyzed by GPC.

Example 5—Polymer P70 with $LiV_3O_8$ Oxide/pH Below 7

8.04 grams of $LiV_3O_8$ and 0.43 gram of Ketjen carbon are dry-mixed by mechanofusion for 45 minutes. The co-ground $LiV_3O_8$-carbon thus obtained is mixed with 3.25 grams of polymer P70 and 0.904 gram of LiTFSI, to which are added 27 ml of acetonitrile; this mixture is introduced into a metal container, ⅓ of the volume of which is occupied by the solution, ⅓ by steel beads and ⅓ of the volume is free. The coating is obtained by HEBM, for 30 minutes at 25° C.

The solution is spread onto an aluminum current collector, using the doctor blade method. The electrode is dried under vacuum for 24 hours. The electrode obtained has a thickness of 45 micrometers. The cell assembly is as follows: lithium/SPE/P70/LVO-P70.

The capacity of the cell is 5 mAh, and the battery is maintained at 80° C. for 2 weeks, in potentiostat mode at 3.6 volts.

The capacity fell by 25% (3.75 mAh), this loss of capacity being directly linked to the dissolution of $LiV_3O_8$, whose pH is less than 7.

Example 6—4-Branch Polymer with $LiV_3O_8$/pH of 7

8.04 grams of $LiV_3O_8$ and 0.43 gram of Ketjen carbon are dry-mixed by mechanofusion for 45 minutes. This co-ground $LiV_3O_8$-carbon is mixed with 3.25 grams of the 4-branch polymer (Elexcel TA-210) and 0.904 gram of LiTFSI, to which are added 24.7 ml of acetonitrile. The mixture thus obtained is introduced into a metal container, ⅓ of the volume of which is occupied by the solution of this mixture, ⅓ by steel beads and ⅓ of the volume remains free. The coating is obtained by HEBM, for 30 minutes at 25° C.

The solution is spread onto an aluminum current collector, via the doctor blade method. The electrode is dried under vacuum for 24 hours; the electrode has a thickness of 45 micrometers. The cell assembly is as follows: lithium/SPE/4-branch/LVO-4-branch.

The capacity of the cell is 5.5 mAh, and the battery is maintained at 80° C. for 2 weeks in potentiostat mode at 3.6 volts.

The capacity then measured is 5.2 mAh. The loss of capacity is 1%, which is the limit error of the capacity. This proves that $LiV_3O_8$ is not dissolved.

Example 7—EG with LVO-EG 8.04 grams of $LiV_3O_8$ and 0.43 gram of Ketjen carbon are dry-mixed by mechanofusion for 45 minutes. This co-ground $LiV_3O_8$-carbon is mixed with 3.25 grams of polymer EG and 0.904 gram of LiTFSI, to which are added 45 ml of acetonitrile; this mixture is introduced into a metal container, ⅓ of the volume of which consists of the solution of this mixture, ⅓ of steel beads 6.34 mm in diameter, and ⅓ of the volume remains free. The coating is obtained by HEBM for 30 minutes at 25° C.

The solution is spread onto an aluminum current collector via the doctor blade method. The LVO-EG electrode obtained is dried under vacuum for 24 hours. The electrode has a thickness of 45 micrometers. The cell assembly is as follows: lithium/SPE-EG/-/LVO-EG.

The capacity of the cell is 5.5 mAh, and the battery is maintained at 80° C. for 2 weeks, in potentiostat mode at 3.6 volts.

The capacity then fell by 25% (4.1 mAh). This loss of capacity is directly linked to the dissolution of $LiV_3O_8$, whose pH is less than 7.

Example 8—P70 with $LiFePO_4$/pH Above 7

8 grams of $LiFePO_4$ and 0.45 gram of Ketjen carbon are dry-mixed by mechanofusion for 45 minutes. This co-ground $LiFePO_4$-carbon is mixed with 3.25 grams of polymer P70 and 0.9 gram of LiTFSI, to which are added 45 ml of acetonitrile. This mixture is introduced into a metal container, ⅓ of the volume of which is filled with the solution of this mixture, ⅓ with steel beads 6.34 mm in diameter and ⅓ of the volume remains free. The coating is obtained by HEBM for 30 minutes at 25° C.

The solution is spread onto an aluminum current collector, via the doctor blade method. The $LiFePO_4$—P70 electrode obtained is dried under vacuum for 24 hours. The electrode has a thickness of 45 micrometers. The cell assembly is as follows: lithium/SPE-P70/-/LVO-P70.

The capacity of the cell is 4.5 mAh, and the battery is maintained at 80° C. for 2 weeks, in potentiostat mode at 3.63 volts.

The capacity then fell by 27% (4.28 mAh). This loss of capacity is directly linked to the instability to oxidation of the polymer P70.

When the battery is maintained at 80° C. for 2 weeks, in potentiostat mode at 4.00 volts, the capacity falls by 51% (2.2 mAh). This loss of capacity is directly linked to the instability to oxidation of the polymer P70.

Example 9—4-Branch with $LiFePO_4$/pH Above 7

78 grams of $LiFePO_4$ and 0.45 gram of Ketjen carbon are dry-mixed, by mechanofusion, for 45 minutes. This co-ground $LiFePO_4$-carbon is mixed with 3.25 grams of 4-branch polymer and 0.9 gram of LiTFSI, to which are added 45 ml of acetonitrile; this mixture is introduced into a metal container, ⅓ of the volume of which is filled with the solution of the mixture, ⅓ with steel beads 6.34 mm in diameter and ⅓ of the volume remains free. The coating is obtained by HEBM, for 30 minutes at 25° C.

The solution is spread onto an aluminum current collector, via the doctor blade method. The $LiFePO_4$-4B electrode is dried under vacuum for 24 hours. The electrode has a thickness of 45 micrometers. The cell assembly is as follows: lithium/SPE-EG/-/$LiFePO_4$-4B.

The capacity of the cell is 4.5 mAh. The battery is maintained at 80° C. for 2 weeks in potentiostat mode at 3.63 volts.

The capacity remains unchanged (4.5 mAh), the maintenance of the capacity being directly linked to the stability to oxidation of the 4-branch polymer.

When the battery is maintained at 80° C. for 2 weeks, in potentiostat mode at 4.00 volts, the loss of capacity is 1% (4.45 mAh). This loss of capacity is directly linked to the instability to oxidation of the polymer.

The maintenance of the capacity is directly linked to the stability to oxidation of the 4-branch polymer (4B).

Example 10—4-Branch with $LiFePO_4$/pH Above 7

78 grams of $LiFePO_4$ and 0.45 gram of Ketjen carbon are dry-mixed by mechanofusion for 45 minutes. This co-ground $LiFePO_4$-carbon is mixed with 3.25 grams of polymer EG-2500 and 0.9 gram of LiTFSI, to which are added 45 ml of acetonitrile. This mixture is introduced into a metal container, ⅓ of the volume of which is occupied by the solution of this mixture, ⅓ by steel beads 6.34 mm in diameter and ⅓ of the volume remains free. The coating is obtained by HEBM for 30 minutes at 25° C.

The solution is spread onto an aluminum current collector, using the doctor blade method. The $LiFePO_4$-4B electrode is dried under vacuum for 24 hours. The electrode has a thickness of 45 micrometers. The cell assembly is as follows: lithium/SPE-EG/-/$LiFePO_4$-4B.

The capacity of the cell is 4.5 mAh, and the battery is maintained at 80° C. for 2 weeks, in potentiostat mode at 3.63 volts.

The capacity remains unchanged (4.5 mAh). Maintenance of the capacity is directly linked to the stability to oxidation of the 4-branch polymer.

When the battery is maintained at 80° C. for 2 weeks, in potentiostat mode at 4.00 volts, the loss of capacity is 1% (4.45 mAh). This loss of capacity is directly linked to the instability to oxidation of the polymer.

Maintenance of the capacity is directly linked to the stability to oxidation of the 4-branch polymer.

Example 11—EG2500 with $LiFePO_4$/pH Above 7

78 grams of $LiFePO_4$ and 0.45 gram of Ketjen carbon are dry-mixed by mechanofusion for 45 minutes. The co-ground $LiFePO_4$-carbon obtained is mixed with 3.25 grams of polymer EG-2500 and 0.9 of LiTFSI, to which are added 45 ml of acetonitrile. The mixture thus obtained is introduced into a metal container, ⅓ of the volume of which is filled with the solution of this mixture, ⅓ with steel beads 6.34 mm in diameter, and ⅓ of the volume remains free. The coating is obtained by HEBM for 30 minutes at 25° C.

The solution is spread onto an aluminum current collector 17 μm thick, using the doctor blade method. The $LiFePO_4$-4B electrode is dried under vacuum for 24 hours; it has a thickness of 45 micrometers. The cell assembly is as follows: lithium/SPE-EG/-/$LiFePO_4$-polymer 4B.

The capacity of the cell is 4.5 mAh. The battery is maintained at 80° C. for 2 weeks, in potentiostat mode at 3.63 volts.

The capacity remains unchanged (4.5 mAh), maintenance of the capacity being directly linked to the stability to oxidation of the 4-branch polymer.

When the battery is maintained at 80° C. for 2 weeks in potentiostat mode at 4.00 volts, the loss of capacity is 1% (4.45 mAh). This loss of capacity is directly linked to the instability to oxidation of the polymer.

Maintenance of the capacity is directly linked to the stability to oxidation of the EG polymer.

The coated particles of the invention prove to have excellent electrochemical properties, especially as regards the service life of the batteries into which they are incorporated and on account of their economic value.

FIG. 1 illustrates the dissolution phenomenon observed for small uncoated particles based on lithium vanadium oxide of formula $LiV_3O_8$. The insertion of Li into vanadium oxide causes an increase in the volume of the particles; originally of an average size of 5 micrometers (D50). The lithiated particles have an average size of 5.5 micrometers (D55), which corresponds to a size increase of 3 to 4%. After 50 cycles, the metal oxide particles have a smaller average size, of 3.5 micrometers.

Figure 2:
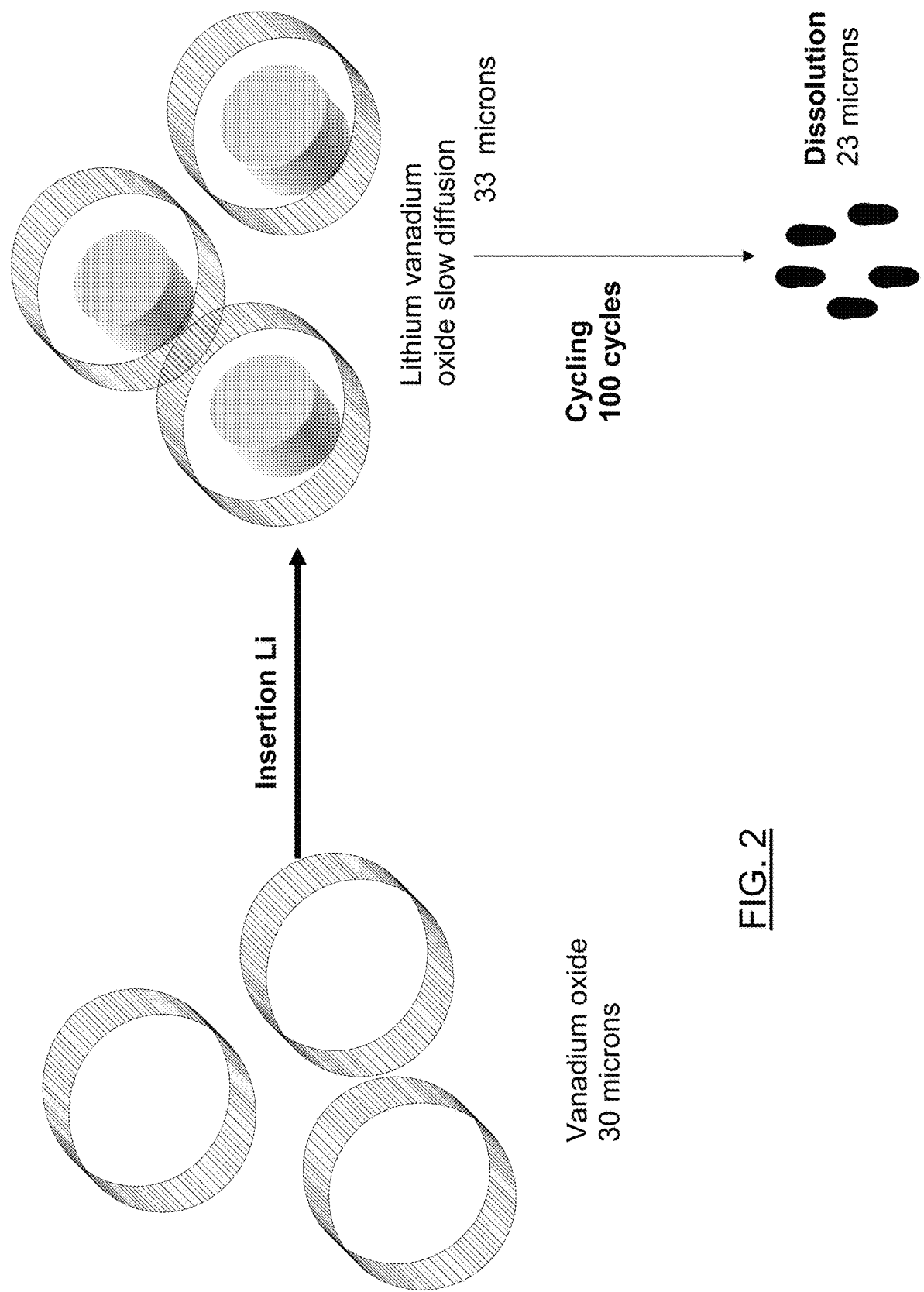
FIG. 2 illustrates the phenomenon of dissolution of uncoated large particles based on lithium vanadium oxide.

FIG. 2 illustrates the dissolution phenomenon of large uncoated particles based on lithiated vanadium oxide. The insertion of Li into vanadium oxide causes an increase in the volume of the particles. The lithiated particles have an average size of 33 micrometers. After 100 cycles, the metal oxide particles have an average size of 23 micrometers.

Figure 4:
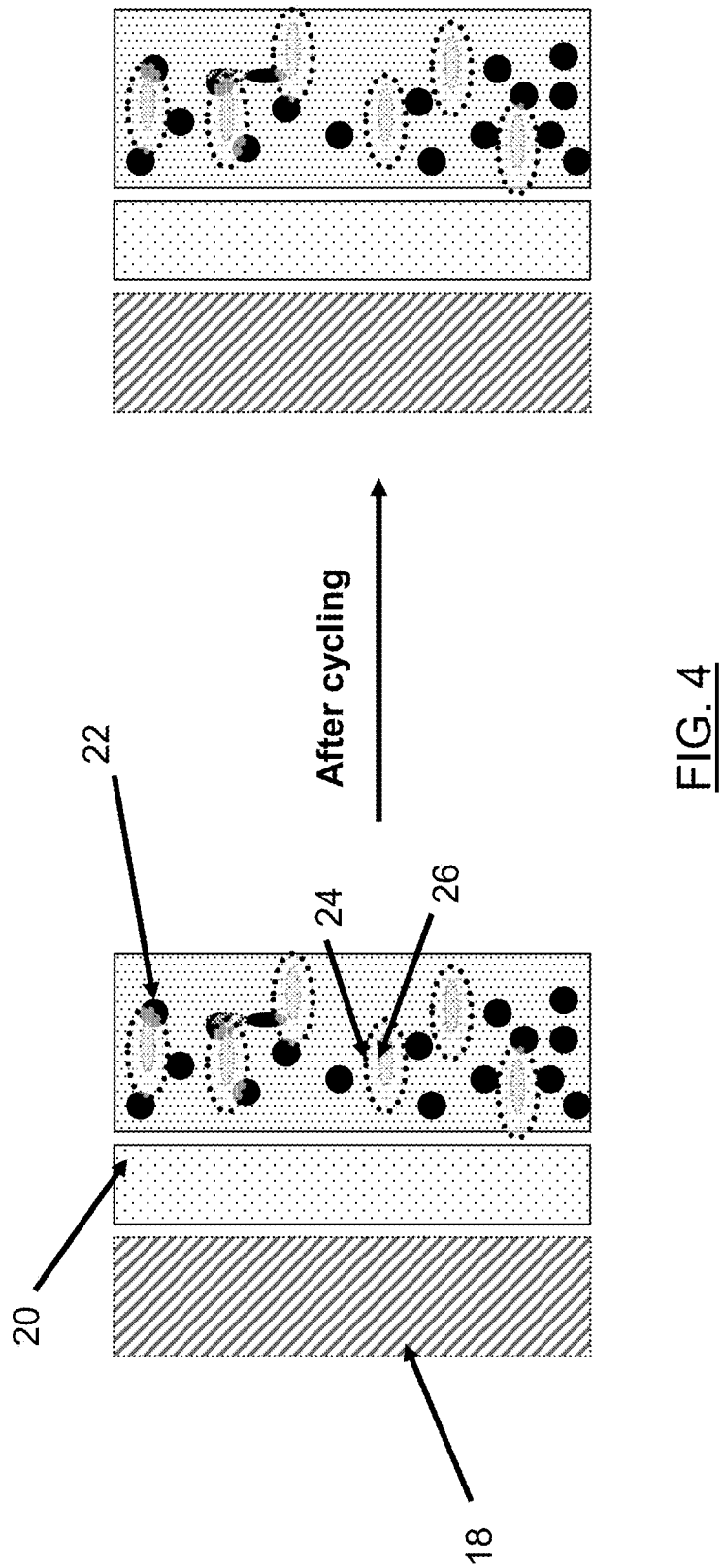
FIG. 4 shows the behavior of an electrode according to the invention, in which the metal oxide particles have been coated with a stable polymer that slows down the dissolution of the vanadium in the electrode.

FIG. 4 shows the behavior of an electrode according to the invention, in which the metal oxide particles have been coated with a stable polymer that slows down the dissolution of the vanadium in the electrode. The references used in FIG. 4 are: 18 for lithium, 20 for SPE, 22 for Ketjen carbon, 24 for (4-branch polymer) coating the oxide, and 5 for oxide core.

Although the present invention has been described with the aid of specific implementations, it is understood that several variations and modifications may be applied to said implementations, and the present invention is directed toward covering such modifications, uses or adaptations of the present invention, following in general the principles of the invention and including any variation of the present description that will become known or conventional in the field of activity in which the present invention is based, and which may be applied to the essential elements mentioned above.

EMBODIMENTS

1. A particle comprising a core and a coating that covers at least part, preferably at least 80%, even more preferentially at least 90% and most advantageously 100% of the surface of said core, said particle being characterized in that:
    said core is preferably composed to at least 90% and even more preferentially to at least 94% by weight of an acidic metal oxide, with a pH preferably of less than 6.5, and even more preferentially with a pH of between 3 and 6;
    the coating of the core being based on a polymer, preferably based on a salified polymer, whose electrochemical stability is greater than or equal to 3.7 volts;
    the mean thickness of the coating is preferably between 500 nanometers and 2 micrometers and the coated core has a mean size $d_{50}$ preferably of between 500 nanometers and 40 micrometers, and even more preferentially this size is between 2 and 20 micrometers; and
    the degree of solubility (ds), for a given time, of the metal oxide migrating toward the electrolyte, per cycle, is less than 5 per 10 000, and this degree is preferably between 2 and 4.5 per 10 000.

2. The particle as in embodiment 1, characterized in that the polymer used to prepare the coating is chemically stable.

3. The particle as in embodiment 2, characterized in that the polymer used to prepare the coating is chemically very stable.

4. The particle as in embodiment 3, characterized in that the polymer used to prepare the coating is chemically extremely stable.

5. The particle as in embodiment 4, characterized in that the electrochemical stability of the polymer used for the coating is between 3.75 and 5 volts.

6. The particle as in any one of embodiments 1 to 5, in which the metal oxide is chosen from the group constituted by $LiMn_2O_4$, $V_2O_5$, $LiMn_{(2-x)}V_xO_4$ with x ranging from 0 to 1 limits inclusive, $V_8O_{13}$ and $LiV_3O_8$, and the metal oxide is more preferentially $LiV_3O_8$.

7. The particle as in any one of embodiments 1 to 6, in which the core of the particle comprises from 1% to 12% and preferably from 6% to 10% by weight of a carbon preferably chosen from the group constituted by ethylene black, natural graphite, artificial graphite, Shawinigan carbon, Ketjen carbon, and mixtures of at least two thereof.

8. The particle as in any one of embodiments 1 to 7, in which the core coating is based on:
    one or more salified polymers, preferably based on at least one polymer salified with at least one salt chosen from the group constituted by salts of the type LiFSI, LiTFSI, LiBETI, LiDCTA, $LiBF_4$ and $LiPF_6$; and
    10% maximum of fillers preferably chosen from the group constituted by $SiO_2$, $ZrO_2$ and $Al_2O_3$, and mixtures of at least two thereof.

9. The particle as in any one of embodiments 1 to 8, in which the polymer constituting the coating is electrically conductive, and is preferably based on a polymer chosen from the group constituted by polyanilines, preferably from the group of polyanilines with an average molecular weight of greater than 1000 and preferably between 2500 and 50 000.

10. The particle as in any one of embodiments 1 to 9, in which the polymer constituting the coating is electrically nonconductive and is preferably chosen from the group constituted by nonconductive polymers of multibranch type.

11. The particle as in embodiment 10, in which the electrically nonconductive polymer contains at least 3 branches, and is even more preferentially of 4-branch type, such as those described in international patent application WO 03/063 287 (and more particularly on pages 5, 8 and 9), filed in the name of Hydro-Quebec, and also in columns 1 and 2 of American patent U.S. Pat. No. 6,190,804 and which have acrylate (preferably methacrylate) and alkoxy (preferably alkoxy containing from 1 to 8 carbon atoms, even more preferentially methoxy or ethoxy), or vinyl hybrid end groups.

12. The particle as in any one of embodiments 1 to 11, in which the metal oxide is a (50:50) mixture of $LiV_3O_8$ and $V_2O_5$.

13. The particle as in embodiment 1, comprising an $LiV_3O_8$ metal oxide core 5 microns in size, covered over 80% of its surface with a coating constituted by the polymer of 4-branch type and with a mean thickness of between 10 nanometers and 5 micrometers and preferably between 15 nanometers and 2 micrometers, characterized by a ds of less than 5%.

14. The particle as in embodiment 1, comprising a $V_2O_5$ metal oxide core 5 micrometers in size, covered over 80% of its surface with a coating constituted by the polymer 4B and with a mean thickness of between 10 nanometers and 5 micrometers and preferably between 15 nanometers and 2 micrometers, characterized by a ds of less than 4%.

15. A process for preparing a homogeneous mixture of particles as in any one of embodiments 1 to 14, by preparation of a mixture of the polymer and of a metal oxide, via the dry route without any addition of solvent, preferably in weight proportions of from 10% to 90% and preferably from 40% to 80% for each of the constituents of the mixture, the amount of metal oxide present in the mixture preferably being greater than that of the polymer.

16. A process for preparing a homogeneous mixture of particles as in any one of embodiments 1 to 14, in which the mixing is performed:
 by preparing a mixture of the polymer and of a metal oxide, preferably in weight proportions of from 10% to 90% and preferably from 40% to 80% for each of the constituents of the mixture; preferably, the amount of metal oxide present in the mixture is greater than that of the polymer; and
 with addition to the solvent of at least one solvent chosen from the group constituted by acetone, acetonitrile, toluene, MEK, NMP or mixtures of at least two thereof; preferably, the solvent used represents by volume from 10% to 80% and more preferentially from 20% to 70% of the total volume of the solvent and of the mixture.

17. The process as in embodiment 15 or 16, in which the mixing is performed by ball milling, sand milling, HEBM, mechanofusion, in an Agglomaster or Nobita® mixer, or by using at least two of these techniques and preferably at a temperature of between 10 and 40° C., preferably in the presence of an inert gas chosen from the group constituted by nitrogen, argon or dry air.

18. An electrode constituted by an electrode support, said support preferably being made of a metallic material or of a conductive plastic material, and at least partially covered, preferably homogeneously, with a mixture constituted by at least 40% and preferably from 50% to 80% by weight of particles defined in any one of embodiments 1 to 14 or obtained by one of the processes defined in any one of embodiments 15 to 17.

19. The electrode as in embodiment 18, in which at least one polymer is a binder for said electrode by creating bridges between the electrode support, the metal oxide-based particles and the polymer-based coating.

20. The electrode as in embodiment 19, in which the binding polymer is a mixture of a coating polymer of high stability and of binding nature and of a polymer that ensures binding between the particles of the cathode and that is other than the polymer present in the coating.

21. The electrode as in embodiment 19, in which the binding polymer consists solely of the coating polymer of high electrochemical stability.

22. The electrode as in any one of embodiments 18 to 21, comprising at least one polymer containing at least one lithium salt and at least one carbon with a specific surface area of greater than or equal to 1 $m^2/g$, preferably at least one carbon with a specific surface area of greater than 50 $m^2/g$.

23. The electrode as in embodiment 22, in which the (polymer-oxide-salt-carbon) mixture has been prepared without addition of solvent, preferably by using the doctor blade method and/or by extrusion.

24. The electrode as in embodiment 22, in which the (polymer-oxide-salt-carbon) mixture has been prepared with addition of a solvent preferably chosen from the group constituted by acetone, acetonitrile, toluene, MEK, VC, DEC, DMC, EMC, DME or mixtures of at least two thereof, preferably by using the doctor blade method and/or by extrusion.

25. The electrode as in embodiment 23 or 24, in which the composition of the polymer represents from 1% to 70% by weight relative to the total weight of the (polymer+salt+oxide+carbon) mixture.

26. The electrode as in embodiment 25, in which the composition of the carbon represents from 1% to 10% by weight relative to the total weight of the (polymer+salt+oxide+carbon) mixture.

27. The electrode as in any one of embodiments 18 to 26, in which the concentration of the salt, present in the (polymer-oxide-salt-carbon) mixture, and expressed relative to the polymer, is between 0.1 M and 3 M and preferably between 0.7 M and 2 M.

28. The electrode as in any one of embodiments 18 to 27, in which the carbon, present in the (polymer-oxide-salt-carbon) mixture, is a mixture of a first carbon of graphite nature with a specific surface area of less than 50 $m^2/g$ and of a second carbon of non-graphite type with a large surface area, the specific surface area of which is greater than 50 $m^2/g$, the specific surface area being measured according to the BET method.

29. The electrode as in any one of embodiments 18 to 27, in which the carbon is of VGCF carbon fiber, Ex mesophase or PAN (polyacrylonitrile) type.

30. The electrode as in embodiment 29, in which the salt is dissolved in the polymer and it is chosen from the group constituted by LiFSI, LiTFSI, LiBETI and $LiPF_6$ and mixtures of at least two thereof.

31. A process for preparing an electrode as in any one of embodiments 18 to 28, in which an oxide-polymer-salt-carbon liquid mixture is spread onto a current collector of metal type by extrusion or with a doctor blade, slot die or coma.

32. The process for preparing an electrode as in embodiment 31, in which the polymer is of the four-branch type preferably with at least two branches capable of giving rise to crosslinking, and it is converted into a polymer matrix, optionally in the presence of an organic solvent, by crosslinking after spreading the mixture onto the electrode support.

33. The process for preparing an electrode as in embodiment 32, in which the crosslinking is performed without addition of a crosslinking agent other than the metal oxide.

34. A process for preparing an electrochemical generator comprising at least one anode, at least one cathode and an electrolyte, in which at least one of the electrodes is as defined in any one of embodiments 18 to 30, or as obtained by one of the processes defined in any one of embodiments 31 to 33.

35. The process for preparing an electrochemical generator as in embodiment 34, in which the electrochemical generator is of the lithium generator type and the spread cathode is introduced into said lithium generator with a dry polymer as electrolyte, the battery not containing any liquid solvent.

36. The process for preparing an electrochemical generator as in embodiment 35, in which the electrolyte is constituted of the same material as the binder and as the coating.

37. The process for preparing an electrochemical generator as in embodiment 35, in which the electrolyte is constituted of a material other than that which constitutes the binder and/or the coating.

38. The process for preparing an electrochemical generator as in any one of embodiments 34 to 37, in which the electrolyte also acts as separator and is constituted by a dry polymer with an electrochemical stability of greater than 3.7 volts.

39. The process for preparing an electrochemical generator as in any one of embodiments 34 to 37, in which the electrolyte also acts as separator and is constituted by a dry polymer with an electrochemical stability of less than 3.7 volts.

40. The process for preparing an electrochemical generator as in any one of embodiments 34 to 39, in which the anode is of lithium or lithium alloy or carbon, graphite, carbon fiber, $Li_4Ti_5O_{12}$ or $WO_2$ type, preferably lithium metal or slightly alloyed lithium.

41. The process for preparing an electrochemical generator as in embodiment 40, in which the lithium is alloyed with Al, Sn, carbon, Si or Mg and the content of alloyed metals is greater than 50 ppm and preferably greater than 500 ppm.

42. An electrochemical generator obtained by performing one of the processes as in any one of embodiments 31 to 41.

43. An electrochemical generator containing at least one constituent element comprising particles as defined in any one of embodiments 1 to 14 or as obtained by performing a process as in any one of embodiments 15 to 17.

44. A generator obtained by performing one of the processes defined in any one of embodiments 36 to 41 or as defined in embodiment 42 or 43.

45. The use of a generator as in embodiment 44 in an electrical vehicle, in a hybrid vehicle, in telecommunications, in UPSs and in electrochromic devices.

46. The process for preparing an electrode as in embodiment 31, in which the polymer is of EG type, preferably with at least two branches capable of giving rise to crosslinking, and said polymer is converted into a polymer matrix, optionally in the presence of an organic solvent, by crosslinking after spreading the mixture onto the electrode support.

47. A process for reducing the solubility of metal oxides in electrochemical systems, which consists in increasing the pH of the oxide, preferentially by selecting the nature and the amount of the carbon mixed with the oxide particles, more particularly by coating the oxide particles with a polymer, based on PEO, polyacrylonitrile, PMMA and/or PVC dissolved in a solvent (acetonitrile, water, acetone, methanol, etc.) and then by drying the composition and carbonizing it at a temperature of about 600-700° C., under an inert atmosphere for 8-12 hours; the amount and type of the polymer used being linked to the residual content of carbon present at the surface of the oxide particles, and the mixing of the oxide and the polymer solution possibly being advantageously performed with a jar mill, a bar mill or a paint mixer.

The invention claimed is:
1. A material comprising core-shell particles, wherein the core-shell particles comprise a core and a shell in the form of a coating that covers at least part of the surface of said core, wherein:
said core is composed of at least 90% by weight of $LiV_3O_8$, and comprises from 1% to 10% by weight of a carbon component selected from the group consisting of ethylene black, natural graphite, artificial graphite, carbon black, and mixtures of at least two thereof;
the coating of the core is based on a polymer, whose electrochemical stability is greater than or equal to 3.7 volts;
the coating comprises at least one salt selected from the group consisting of LiFSI, LiTFSI, LiBETI, LiDCTA, $LiBF_4$ and $LiPF_6$;
a mean thickness of the coating is between 500 nanometers and 2 micrometers and the core-shell particles have a mean size $d_{50}$ between 500 nanometers and 40 micrometers;
a degree of solubility (ds) of the metal oxide migrating toward an electrolyte, per cycle, is less than 5 per 10,000;
the coating based on a polymer is obtained from a non-electrically conductive star shape polyether which comprises at least four branches having end groups comprising functions selected from the group consisting of: acrylate or methacrylate and alkoxy, allyloxy and/or vinyloxy, of which at least one allows crosslinking; and
the core-shell particles, when incorporated into an electrode, lead to a capacity loss of about 1% or less when maintained at about 80° C. for 2 weeks in potentiostat mode at about 3.6 to about 4 volts.

2. The material of claim 1, wherein the non-electrically conductive star shape polyether which comprises at least four branches having end groups comprises an acrylate or methacrylate which allows crosslinking.

3. The material of claim 1, wherein the core is 5 microns in size.

4. The material of claim 1, the coating further comprising 10% by weight maximum of a filler selected from the group consisting of $SiO_2$, $ZrO_2$ and $Al_2O_3$, and mixtures of at least two thereof.

5. An electrode comprising an electrode support made of a metallic material or of a conductive plastic material, the electrode support being at least partially covered with the material of claim 1.

6. The electrode of claim 5, wherein the material comprises a polymer which is different from the polymer present in the coating and ensures binding between particles of the electrode.

7. The electrode of claim 5, comprising at least one polymer containing at least one lithium salt and at least one carbon with a specific surface area of greater than or equal to 1 $m^2/g$.

8. The electrode of claim 7, wherein:
a composition of said at least one polymer represents from 1% to 70% by weight relative to total weight of a (polymer+salt+metal oxide+carbon) mixture;
a composition of said at least one carbon represents from 1% to 10% by weight relative to the total weight of the (polymer+salt+metal oxide+carbon) mixture; and
a concentration of the salt present in the (polymer+salt+metal oxide+carbon) mixture, expressed relative to said at least one polymer, is between 0.1 M and 3 M.

9. An electrochemical generator containing at least one constituent element comprising the material of claim 1.

10. The material of claim 1, wherein the core consists of $LiV_3O_8$ and the carbon component.

11. The material of claim 1, wherein the core is formed from mechanofusion of $LiV_3O_8$ and the carbon component.

12. A material comprising core-shell particles, wherein the core-shell particles comprise a core and a shell in the form of a coating, wherein:
said core is a $LiV_3O_8$ core, covered over 80% of its surface with a coating;

said core is composed of at least 90% by weight of $LiV_3O_8$, and comprises from 1% to 10% by weight of a carbon component selected from the group consisting of ethylene black, natural graphite, artificial graphite, carbon black and mixtures of at least two thereof;

said coating comprises at least one salt selected from the group consisting of LiFSI, LiTFSI, LiBETI, LiDCTA, $LiBF_4$ and $LiPF_6$;

said coating is obtained from a non-electrically conductive star shape polyether which comprises at least four branches having end groups comprising functions selected from the group consisting of: acrylate or methacrylate and alkoxy, allyloxy and/or vinyloxy, of which at least one allows crosslinking, having a mean thickness of between 10 nanometers and 5 micrometers, whose electrochemical stability is greater than or equal to 3.7 volts;

said particles comprise a degree of solubility (ds) of the of the $LiV_3O_8$ migrating toward an electrolyte, per cycle, of less than 5 per 10,000; and the core-shell particles, when incorporated into an electrode, lead to a capacity loss of about 1% or less when maintained at about 80° C. for 2 weeks in potentiostat mode at about 3.6 to about 4 volts.

13. The material of claim 12, wherein the core is 5 microns in size.

14. The material of claim 12, wherein the core consists of $LiV_3O_8$ and the carbon component.

15. The material of claim 12, wherein the core is formed from mechanofusion of $LiV_3O_8$ and the carbon component.

* * * * *